US008781875B2

(12) United States Patent
Chatter et al.

(10) Patent No.: US 8,781,875 B2
(45) Date of Patent: Jul. 15, 2014

(54) SYSTEM FOR AND METHOD OF AUTOMATIC OPTIMIZING QUANTITATIVE BUSINESS OBJECTIVES OF SELLERS (ADVERTISERS) WITH SYNERGISTIC PRICING, PROMOTIONS AND ADVERTISEMENTS, WHILE SIMULTANEOUSLY MINIMIZING EXPENDITURES AND DISCOVERY AND OPTIMIZING ALLOCATION OF ADVERTISING CHANNELS THAT OPTIMIZE SUCH OBJECTIVES

(71) Applicant: Peak Silver Advisors, LLC, Boston, MA (US)

(72) Inventors: Mukesh Chatter, Concord, MA (US); Rohit Goyal, Cambridge, MA (US); Shiao-bin Soong, Littleton, MA (US)

( * ) Notice: Subject to any disclaimer, the term of this patent is extended or adjusted under 35 U.S.C. 154(b) by 0 days.

(21) Appl. No.: 13/925,103

(22) Filed: Jun. 24, 2013

(65) Prior Publication Data
US 2013/0297428 A1 Nov. 7, 2013

Related U.S. Application Data

(63) Continuation of application No. 11/974,808, filed on Oct. 16, 2007, now Pat. No. 8,522,270.

(51) Int. Cl.
*G06Q 30/00* (2012.01)
*G06Q 30/02* (2012.01)
*G06Q 30/06* (2012.01)

(52) U.S. Cl.
CPC .............. *G06Q 30/00* (2013.01); *G06Q 30/02* (2013.01); *G06Q 30/06* (2013.01)
USPC .......................................... 705/7.29; 705/26.1

(58) Field of Classification Search
CPC ........ G06Q 30/00; G06Q 30/02; G06Q 30/06
USPC .................................................. 705/7.29, 26.1
See application file for complete search history.

(56) References Cited

U.S. PATENT DOCUMENTS

| 7,051,351 | B2 * | 5/2006 | Goldman et al. | 725/34 |
| 8,600,815 | B2 * | 12/2013 | Shkedi | 705/14.73 |
| 8,634,652 | B2 * | 1/2014 | Lienhart et al. | 382/195 |
| 2002/0095676 | A1 * | 7/2002 | Knee et al. | 725/46 |
| 2003/0046130 | A1 * | 3/2003 | Golightly et al. | 705/7 |
| 2007/0208630 | A1 * | 9/2007 | Chatter et al. | 705/26 |

* cited by examiner

*Primary Examiner* — Daniel Felten
(74) *Attorney, Agent, or Firm* — Clock Tower Law Group; Erik J. Heels; Michael A. Bartley

(57) ABSTRACT

An Internet system for and method of automatic optimizing quantitative business objectives of sellers (advertisers) with synergistic pricing, promotions and advertisements, while simultaneously minimizing expenditure and discovery and optimizing allocation of advertising channels that optimize such objectives.

30 Claims, 10 Drawing Sheets

Single search engine, multiple sellers

Multiple search engines, multiple sellers

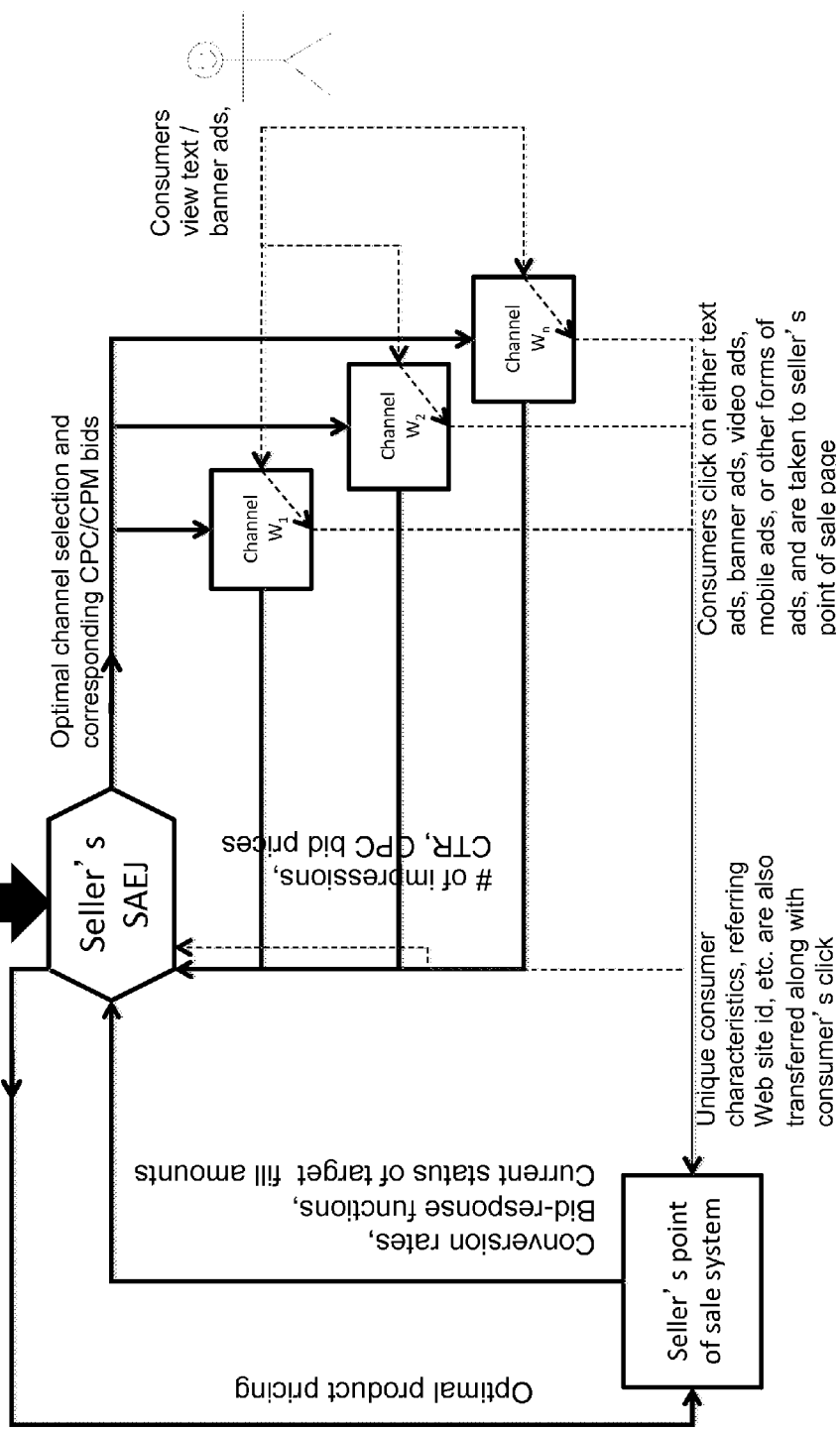

Figure 4:

Exemplary Seller configuration
- Targets (revenue, profit, sales volume) along with other optimizer and/or integrator configs (supplier break, promotions etc)
- Advertising channel config such as list of web sites (W1...Wn) on which to potentially advertise, and for each such web site (Wi):
  - If Wi is a search engine, keywords and ad positions, to consider;
  - If Wi is a banner ad site, sections/banner types to consider;
  - Max CPC/CPM bid config
  - Advertising budgetary constraints
  - Targeting constraints such as demographics, duration, desired time slots, etc

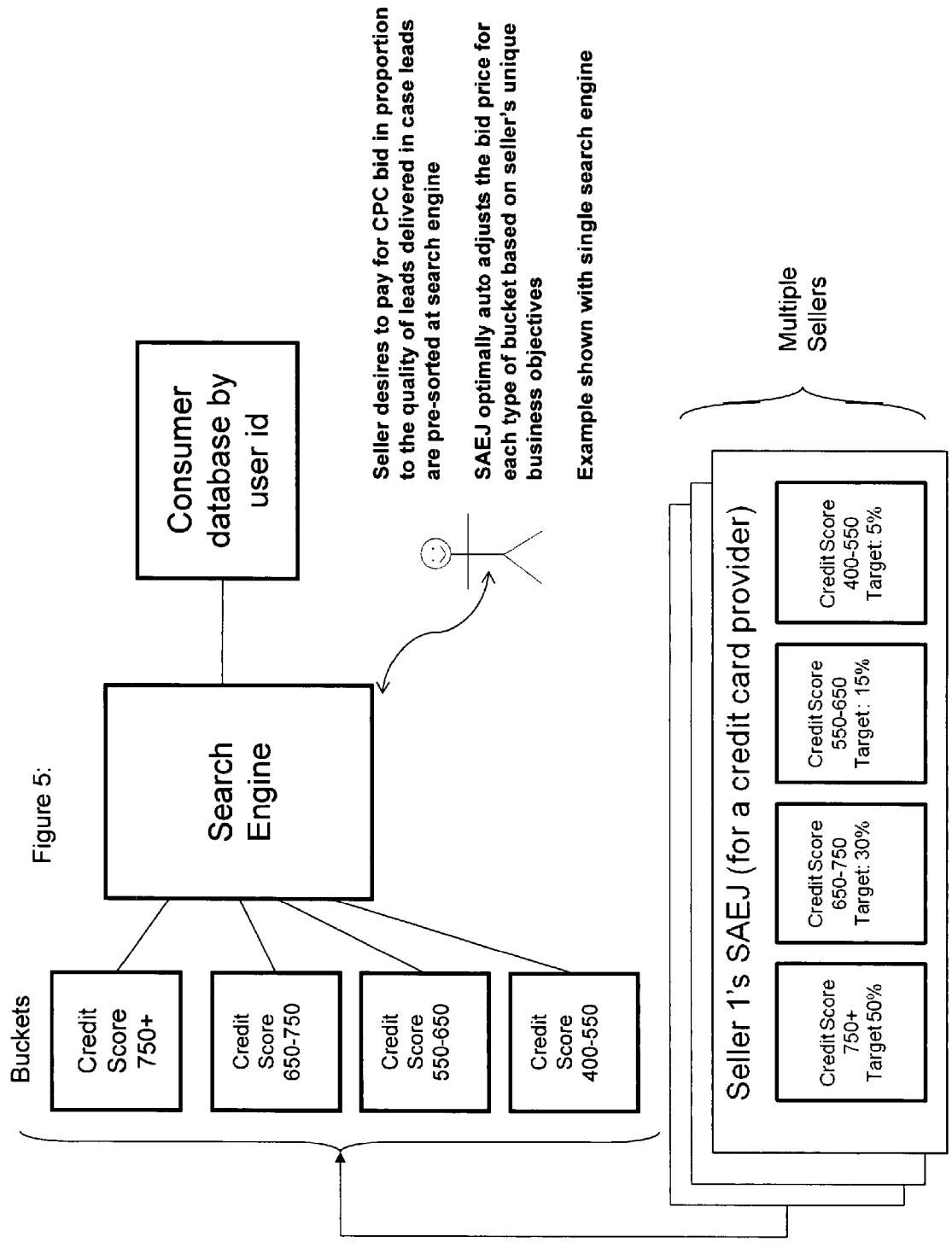

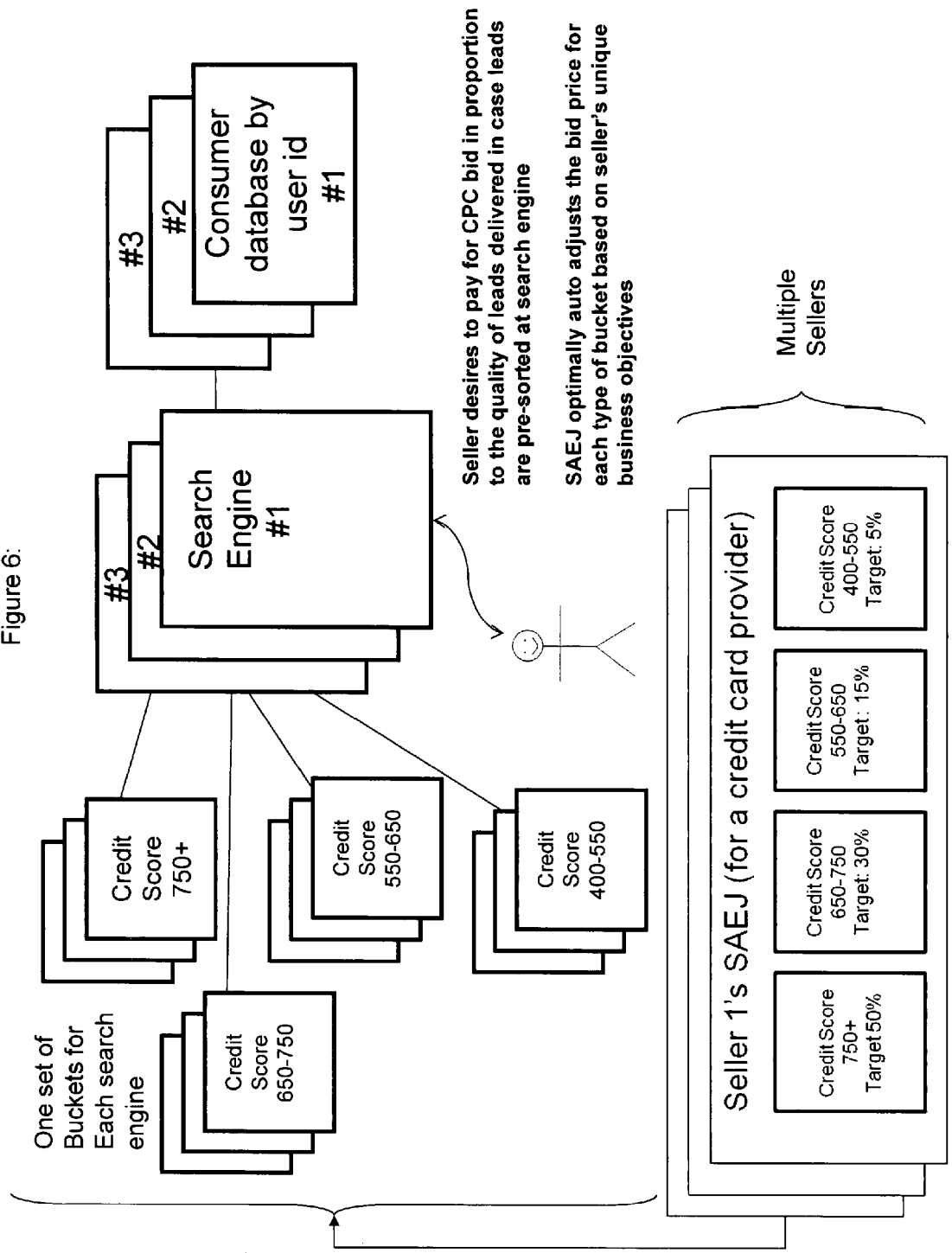

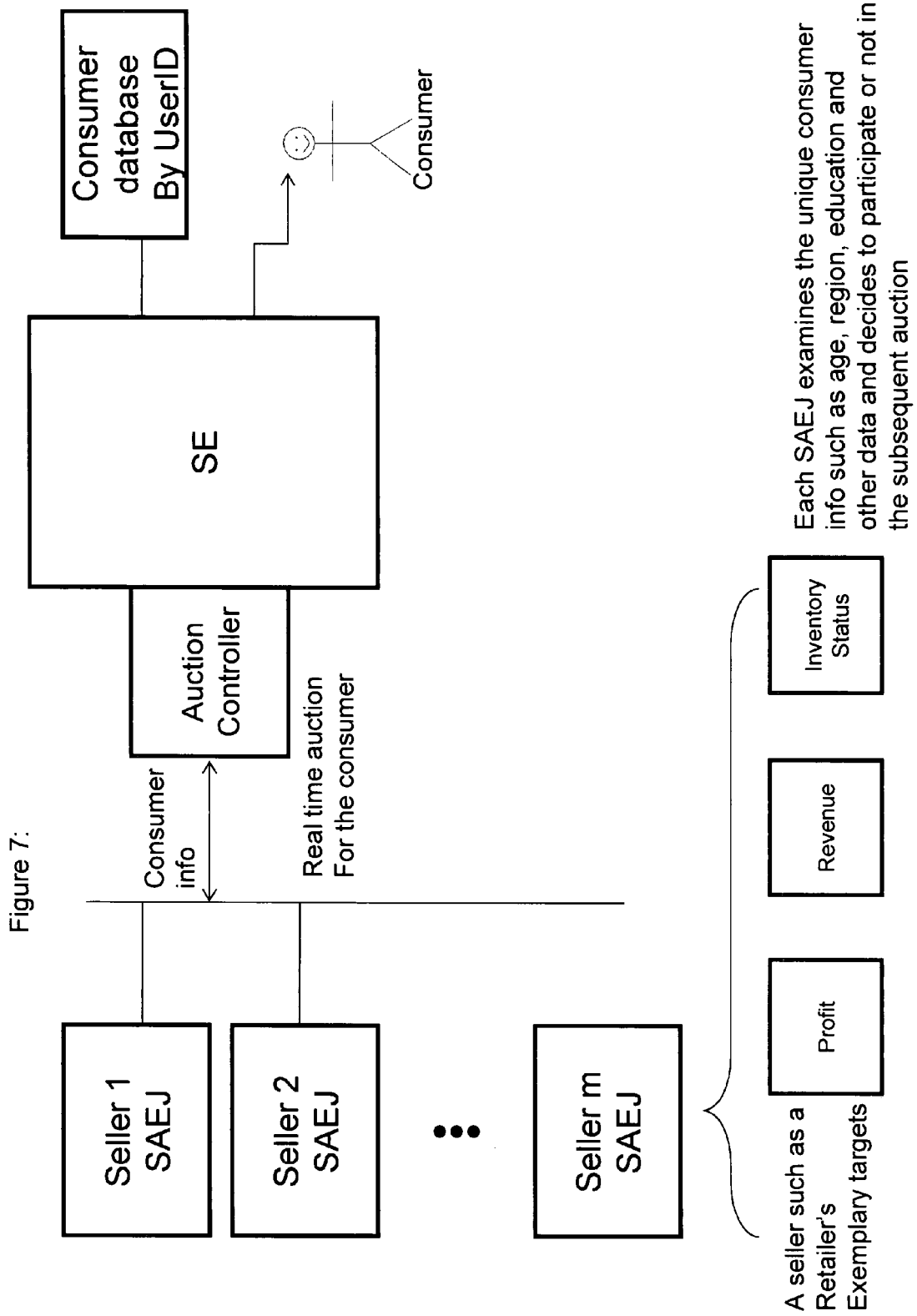

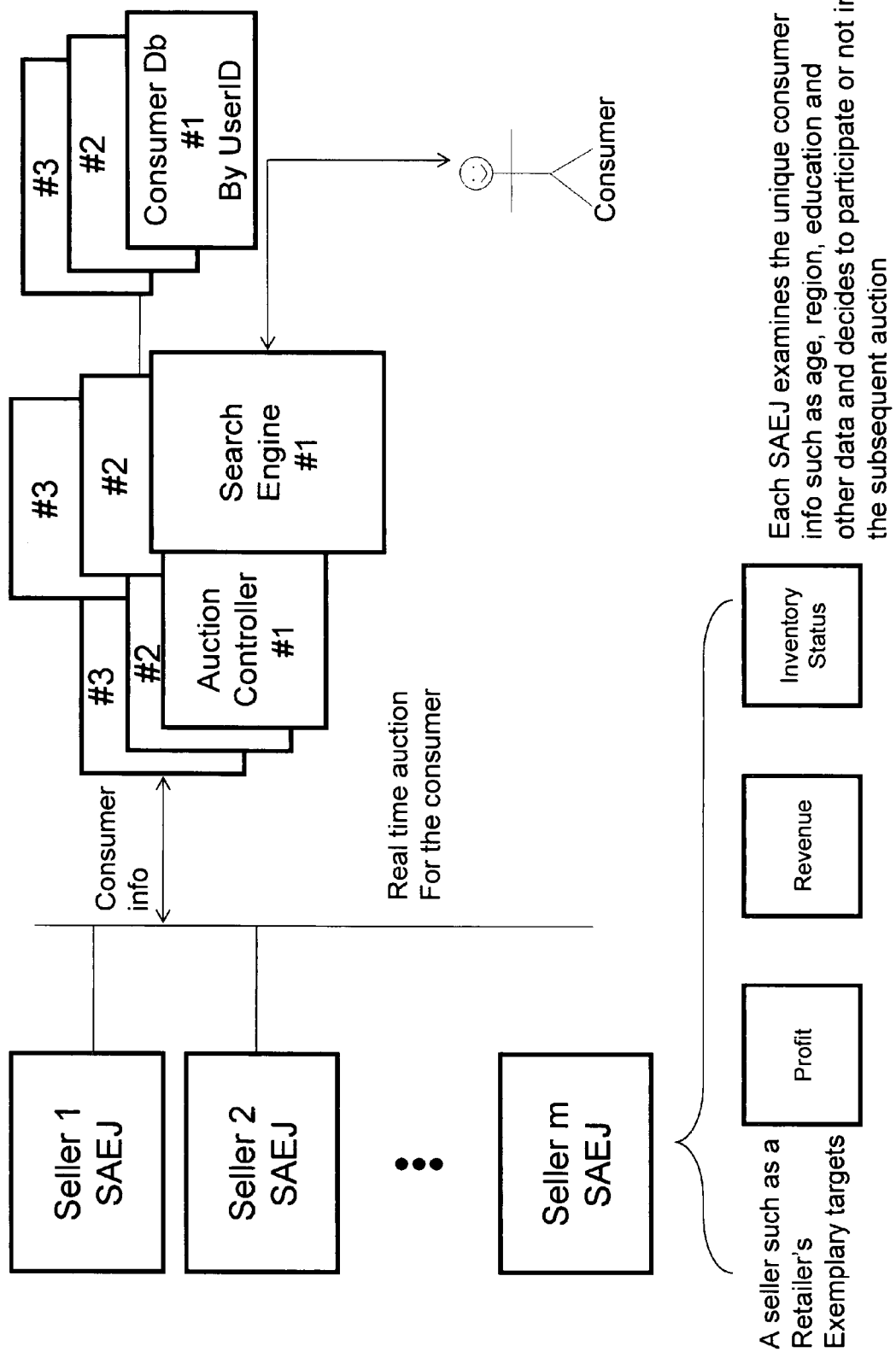

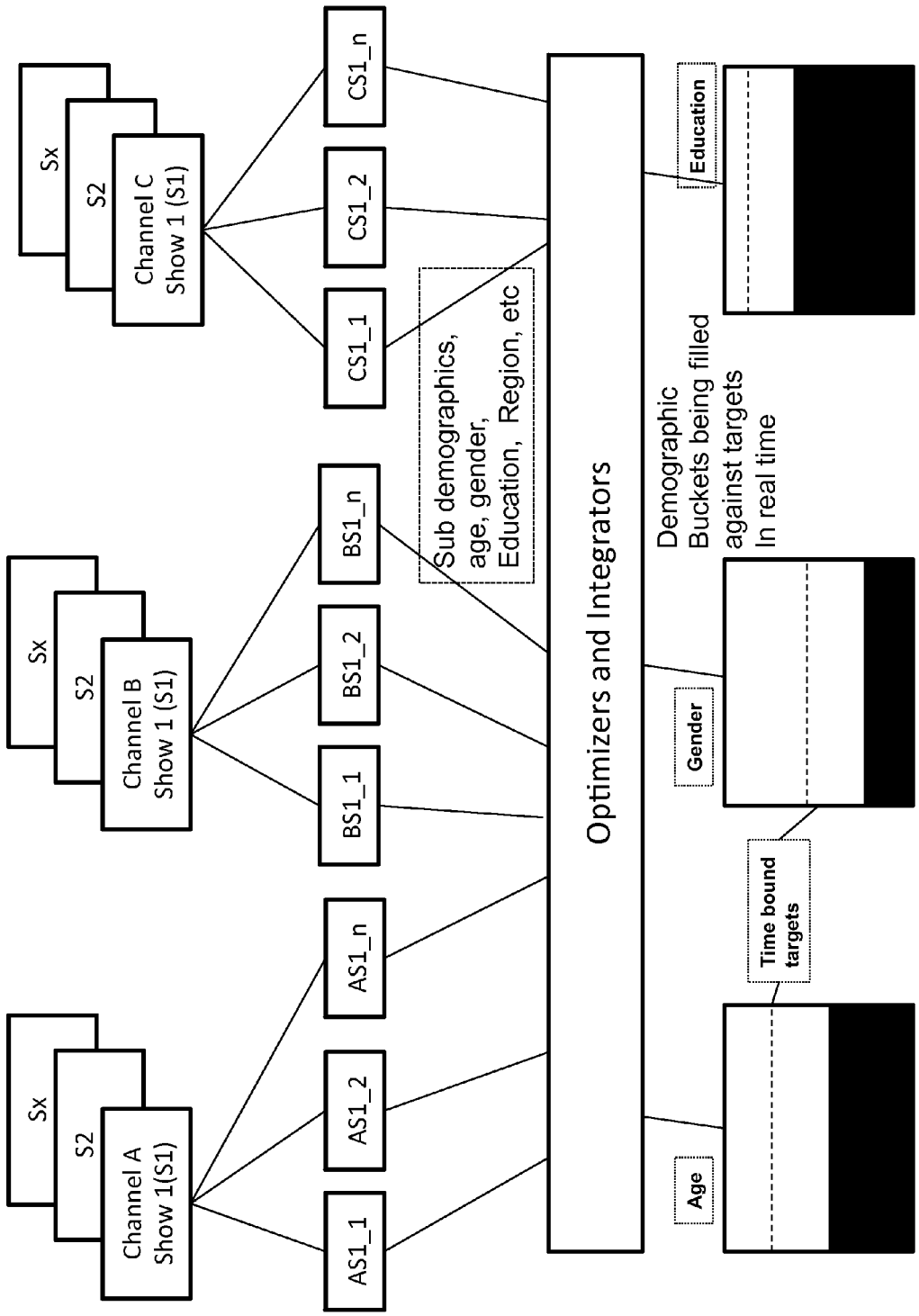

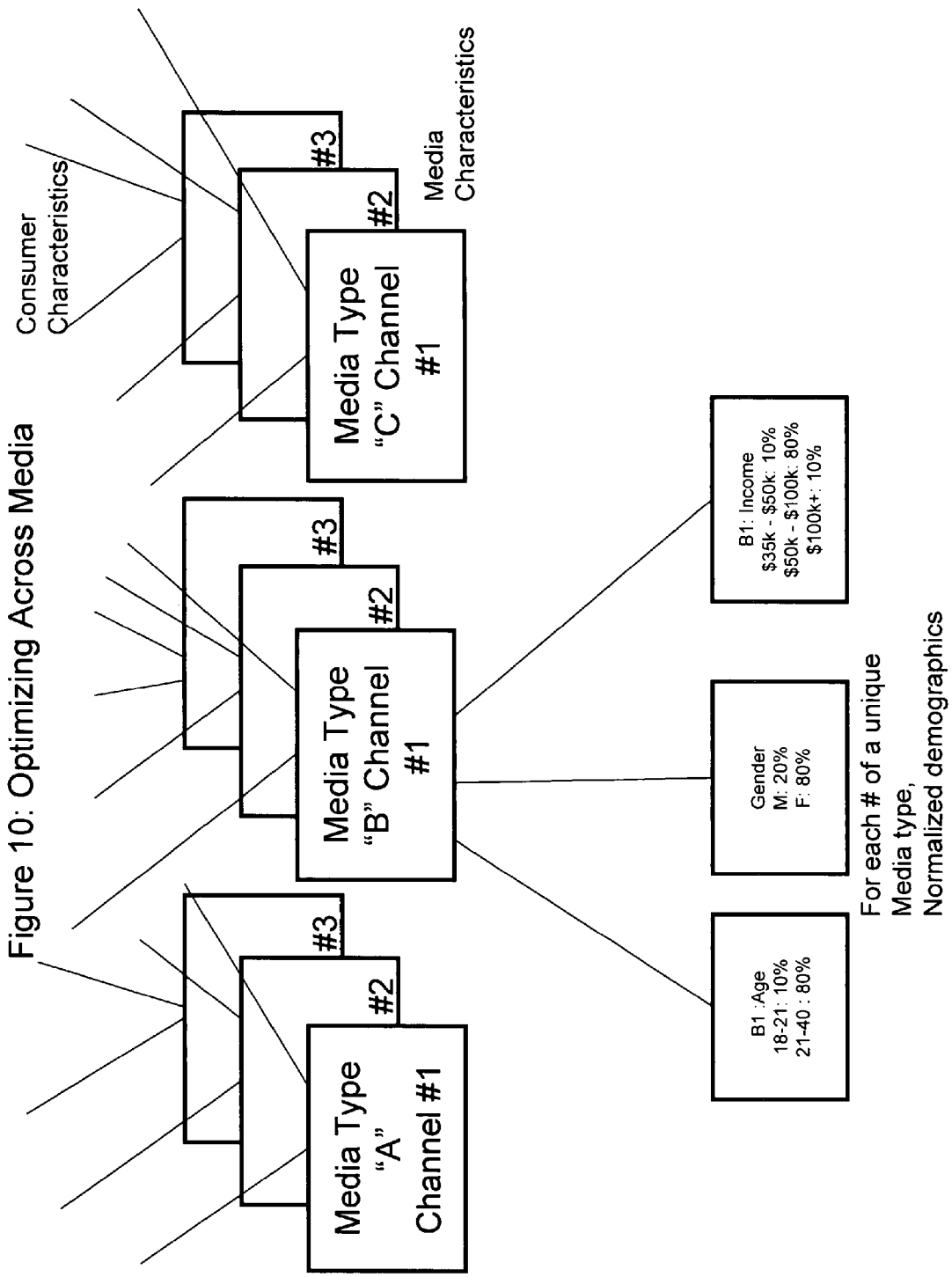

SYSTEM FOR AND METHOD OF AUTOMATIC OPTIMIZING QUANTITATIVE BUSINESS OBJECTIVES OF SELLERS (ADVERTISERS) WITH SYNERGISTIC PRICING, PROMOTIONS AND ADVERTISEMENTS, WHILE SIMULTANEOUSLY MINIMIZING EXPENDITURES AND DISCOVERY AND OPTIMIZING ALLOCATION OF ADVERTISING CHANNELS THAT OPTIMIZE SUCH OBJECTIVES

CROSS-REFERENCE TO RELATED APPLICATIONS

This application is a continuation of U.S. patent application Ser. No. 11/974,808, filed Oct. 16, 2007, titled "System For And Method Of Automatic Optimizing Quantitative Business Objectives Of Sellers (Advertisers) With Synergistic Pricing, Promotions and Advertisements, While Simultaneously Minimizing Expenditures and Discovery and Optimizing Allocation Of Advertising Channels That Optimize Such Objectives" in the name of Mukesh Chatter, Rohit Goyal, and Shiao-bin Soong, which is hereby fully incorporated by reference.

FIELD OF INVENTION

The present invention relates broadly to the field of web-based e-commerce, including on-line shopping for products and services over the Internet, the term "Internet" being used herein to embrace generically all types of public and/or private communication networks using wireless and/or wired transmission media, and combinations of the above, and also specifically the satellite world wide web. More particularly, the present invention is concerned with the challenge of a synergistic tie-in, as a function of time, of the business objectives and targets of a seller of products and or services in transactions with price-comparison features of buyer-seller real-time iterative bidding and offering, in close simulation of the mechanisms of real marketplace auctions, and with the frequency, timing and dynamic allocation of advertising by the sellers among the myriad of advertising media channels available globally. A more particular, though not exclusive, field herein embraced involves improvements in the approach described and claimed in our earlier copending U.S. patent application Ser. No. 11/367,907, filed Mar. 3, 2006, for Method, System And Apparatus For Automatic Real-Time Iterative Commercial Transactions Over The Internet In A Multiple-Buyer, Multiple-Seller Marketplace, Optimizing Both Buyer And Seller Needs Based Upon The Dynamics Of Market Conditions, Publication No. US-2002-0208630-A1 of Sep. 6, 2007, and also in our copending U.S. patent application Ser. No. 11/880,980, filed 25 Jul. 2007 for Improved Seller Automated Engine Architecture And Methodology For Optimized Pricing Strategies In Automated Real-Time Iterative Reverse Auctions Over The Internet And The Like For The Purchase And Sale Of Goods And Services; and specifically its type of automated seller engine, referred to as SAEJ, or the like.

This approach is herein sometimes referred to as the ART-IST architecture (Automated Real-Time Iterative System For On-Demand Transactions), with automatically optimizing of the seller's pricing strategy in real-time and in a dynamic market, and now linked with the present invention to provide an architecture that enables a synergistic automatic decision on allocation of overall advertising budget among these media types (including TV) and sub-elements thereof, dynamically tied-into the optimizing of the business objectives. More generally, the invention is concerned with the automatic budget allocation of search engine and web-based display advertising in an environment of seeking optimal product or service pricing.

BACKGROUND OF INVENTION

General

Since the advent of web based e-commerce, dramatic changes have occurred in the business environment. Some of the major changes result from the evolution of competition from local to global outreach, resulting in the explosive growth of geographically dispersed competitors. Unlike local-centric markets, this fiercely competitive web-based global marketplace has many more degrees of unpredictability, characterized by very rapid changes, including wide variations and swings in prices, in largely uncorrelated advertising and promotion; all in the difficulty of gauging the motivations of the participants, and in the very different underlying cost infrastructures. This web-based market, moreover, operates twenty four hours, seven days a week (24×7), 365 days a year, and is becoming increasingly much more advertising-centric. The margins are dynamically under severe pressure and the advertising expenditure as a percentage of overall business, is rising rapidly.

Although the conventional marketplace is still substantially larger than the web-based market, both are expected to co-exist for years to come. The challenge in managing such a dynamic market requires substantially enhanced planning processes, close monitoring, readiness to respond 24×7, and quick decision making, in order to meet unique business objectives. The challenge is even greater when both modes of operations are simultaneously supported by a seller or vendor.

Questions need to be promptly answered such as, how quickly to adapt to dynamic market conditions and ever-changing competitive pressures without requiring substantial 24×7, 365 days a year manpower support and associated expenditure. The optimal pricing of both the product and an advertisement for that product synergistically in such an environment, presents a very tricky challenge. Such rapidly evolving market conditions, furthermore, increasingly require quick creation of event-driven promotions, and a determination of the best way to accomplish such.

A significant portion of the budget of an enterprise is spent on advertising, and there has been an explosive growth in the number of advertising media channels available, particularly in the past few years. An advertiser (seller) has a choice amongst such multiple types of media outlets, and channels within such—such as hundreds of TV channels, print media, countless websites for on-line display ads (this category also includes banner ads), several search engines, and emerging channels in video and mobile space. The market share percentages among these has been rapidly altering, with print media declining, search engines and web-based display advertising gaining significant ground, and TV advertising growing at a slow, yet steady pace. It remains a huge challenge to decide how much of a seller's advertising budget to allocate to each media type and how much to spend on each channel therewithin, if any, such that the desirable demographics are reached for each media type to meet the time-sensitive business objectives of the seller while minimizing the corresponding advertising expenditure. How to monitor the effectiveness of the ads, and how to make correct decisions in real-time for some media channels, while making decisions months in advance for others (such as TV advertising) and without correctly knowing the corresponding demographics, is very difficult. To complicate matters further, how to tie the seller's business objectives and targets, such as revenue, profit, product inventory and supplier's break, in the case of a retail seller, to the seller's advertising budget and its deployment, is perplexing. If, furthermore, the decisions made do not have the expected impact on the desired business objectives, how can the seller then make appropriate corrections quickly?

Present-day attempts at "solutions" for meeting these needs, do not, unfortunately, actually satisfactorily address the primary set of real-world seller challenges residing in the establishment, monitoring and accomplishment of the duration-sensitive unique seller business targets of optimizing profit, revenue, inventory management, assignment and management of their relative priority as a function of time. Nor do they provide adequate means to reach these targets, including appropriate automatic changes in pricing and in timely promotions, or optimizing of the frequency, timing, and dynamic allocation of advertisements among countless available media channels—all primarily addressed by the present invention. The present invention, indeed, specifically is directed to the overarching challenge of synergistically tying-in the reaching of such business targets and their relative priority with the means to reach such targets, in an ever-evolving dynamic relationship in which presently existing and prior art approaches fall far short of accomplishing.

Though advertising enables higher visibility for the seller (advertiser), the business is entirely conducted by the seller (business owner/manager). It is thus the responsibility of such seller to set time-sensitive business targets such as the before-listed profit, revenue, and inventory control, and to establish supplier's volume break targets with the supplier of the products or services, and additionally, to establish relative priority of these targets as market conditions evolve over time. The ability of a seller to price a product and to time it correctly, and make suitable changes as required to meet the business targets against varying market conditions and competition, is a critical skill. Promotions are another valuable mechanism by which prices are typically adjusted downward, although not necessarily all the time, in anticipation of gaining more business volume. Promotions typically run around major holidays, at the beginning or end of the season and at other times used as an inventory reduction vehicle. Typically, a retailer is entitled to receive an additional discount from its suppliers (also called the before-mentioned "supplier's break"), often retroactive, once a volume target is reached. While it is highly beneficial to accelerate when near such threshold, this capability has largely generally remained unrealized, constrained by human response time and the number of products typically involved.

Sellers also spend money on advertisements to increase visibility in order to attract more customers. Such advertising typically includes multiple media channels such as search engine-based advertising, web display ads, TV ads, etc. Web-based advertising, as via search engines or display ads, are by definition inherently more targeted due to a user's ability to click to instantaneous connection with the advertiser, as compared to the network TV which presently lacks such capability. This makes it difficult for TV networks, to quantify the immediate effectiveness of advertisements as measured in terms of the number of viewers trying to learn more, and/or the actual conversion leading to a transaction for the advertiser shortly after the advertisement display. Allocation of resources among such media types, which not only have different characteristics, but also are measured differently in terms of effectiveness, complicate the decision-making of the seller. When TV and interne ultimately are seamlessly integrated in the future, the difference between web-based display ads and broadcast TV advertisement will disappear as the user will have the ability to click on all ads instantaneously.

The seller challenges, however, are clearly compounded further due to resource/capital allocation conflicts, particularly if a business has multiple sales channels, including, for example, both a physical store and also a virtual presence on web via search engines and display ads. How to make decisions in real-time on so many fronts, all of them frequently moving parts, in a synergistic manner, remains a difficult challenge for any seller, further compounded by the lack of tools and automation to address them. The currently available and prior art tools, indeed, are non real-time, primarily using historic data to speculate the future—an inherently flawed mechanism with wide margin of error, which the present invention completely obviates as later detailed.

Web Based On-Line Advertising

Considering first the background of web-based on-line advertising, such consists of search engine-based advertising and also web-based display ads occurring on numerous web sites, such as at facebook.com, bankrate.com, NYTimes.com and so on. Display advertising is also beginning to get traction in the video arena, such as youtube.com and also in the mobile space.

Search Engines:

Consider search engines such as those currently provided by Google, Yahoo, MSN, or Ask.com, schematically shown used in later discussed FIG. 1 (#1-3) by a plurality of sellers (1-m) in connection with respective consumer databases of user ids. These search engine providers charge advertisers every time a user clicks on one of the advertised links, also known as 'Sponsored Links' in the Google system. Relative placement of such sponsored links on the page where the results are displayed in response to a user query consisting of a set of keywords, is crucial in determining how many users click-on an advertised link The ratio of number of clicks an ad receives out of the number of times it is displayed is known as the 'Click-Through Rate' (CTR). Higher clicks results in more numbers of users visiting the advertiser web site, thereby providing an increased business opportunity. Thus, numerous advertisers, at times hundreds or even thousands, fiercely compete to win, say, 10 coveted sponsored link spots, especially on the first display page. The better the placement on the display pages, the higher the magnitude of the visibility, and the greater the Cost-per-Click (CPC) an advertiser (previously referred to as "seller", used interchangeably herein), pays to the search engine proprietor. In the case of Google, a continuous auction is run to determine which advertiser will receive what display page and what location within that display page. Advertisers place bids in terms of CPC for these spots; such bids are then quickly multiplied by their respective historic corresponding CTRs by popular search engine companies (such as Google) to derive the placement location. As the auction is continuous, the advertisers' placement location keeps changing on a dynamic basis due to intense competitive pressures. In effect, therefore, Google enables a seller, better visibility to its potential customers, and the magnitude of such increased visibility depends on the ad location. This magnitude of visibility is dependent on the seller's own CPC bid, its CTR, market dynamics and by competition. The best analogy is that of a store front, dynamically enabled to conduct business some times on prime real-estate and other times deep in the backwoods, and everywhere in between, depending on the factors outlined earlier. When that store is on prime real estate (first display page, top or near top), the odds of passers-by doing business increase due to the increased visibility; and conversely, when in the backwoods, it decreases. Carrying the analogy further, the percentage change in customer arrival number is also dependent on where the store front is located even among prime real estate sites, similar to the exact location of an ad among top 10 positions on the first display page.

Display Ads:

On-line display ads are another popular and widely used web advertising method and millions of web sites are available as channels for this purpose. Unlike search engine-based advertising, however, where the sponsored links are provided by the search engine along with the search results in response to a query from the user, here the ads are displayed directly on that web site that the user is listed on—for example, at facebook.com or NYTimes.com. These ads can be fully contextual based on a presence of a set of keywords. Alternatively, they may be non-contextual and everything in between, depending on the technology deployed. Many sites show multiple ads at the same time at various locations of the screen, making the ad placement important. These ads are typically sold to the advertisers via the advertising exchanges and the price charged is called 'CPM', also referred to as 'Cost per thousand impressions'. As these ads are displayed, an interested user can click on the ad leading it to the advertiser's web site. An attractive and relevant ad at a popular web site could produce a much higher number of clicks to the advertiser when compared to an infrequently visited site. The number of clicks received against the total impressions made is tracked and is used to evaluate the efficacy of the channel and the associated price for which an advertiser is willing to bid. One of the key differences compared to the search engine-based advertising is that the website which displays the ad makes the bulk of the money, instead of the search engines.

The Web-Based On-Line Seller's (Advertiser's) Challenges:

A seller, prior to making a CPC bid for a specific placement, for a unique set of key words, for a product, or for a specific search engine, needs to evaluate the impact on its unique business targets for each such bid among potentially thousands or more such bids it has to make. Similarly, when a seller makes a decision to CPM bid for an ad for a specific web site for a set of contextual keywords, it needs to evaluate the impact on its targets prior to making each such bid among potentially thousands or more such bids it has to make among numerous web sites. It needs to consider the reduction in profitability against the proposed CPC/CPM expenditure, expected volume of increased visitors to the site and the potential rate of subsequent additional business transactions resulting in higher revenue. Attention also needs to be paid to whether there is adequate or too much in inventory, and how much of it is time sensitive. There is also a possibility that it might get a timely supplier's break with corresponding benefits of increased visitor activity.

The seller further needs to evaluate its pricing strategies at the same time. As part of the CPC/CPM bid preparation process, the seller needs to evaluate against the status of its targets to examine if there is a need to run promotions to further capitalize on the anticipated increased visitor activity, considering the potential CPC expenditure exposure over a pre-specified interval for each search engine. The question arises as to whether there should be an upper limit. If so, the market forces could potentially quickly reduce the number of expected clicks, as the CPC bids are dynamic and change frequently, and even can change at every bid, with impact on the targets. Similar questions need be answered for CPM bids. If the budget is open ended, is the business willing to take significant and unpredictable risk exposure due to such fiercely contested bids, to secure, for example, one of the top displays for the entire interval for each selected search engine; and if so, then what criterion should be used for such a decision. CPC bids for top spots vary for each search engine, and can be very pricey. As an example, at Google, keywords such as 'Refinance Home Loans' currently cost around $40 per click, 'Free Auto Insurance Quote' is around $53 per click, 'Mortgage Refinancing' is about $38 per click, and so on. These, moreover, are not even qualified leads, and they tend to have single digit conversion rates into actual transactions. When measured in thousands of clicks across even only a few search engines, these numbers can run very high and quickly put a business in financial peril, if not very carefully managed. CPM rates are similarly expensive. At boingboing.net site, for example, rectangular banner ads are currently available at $20 for a CPM. Thus allocation of the advertising expenditure among search engines, and amongst numerous desirable web sites for display ads is critical to the success of the business. This, however, has remained an extremely difficult problem to solve until the advent of the present invention.

As a further example, in search engine-based advertising, assume there are but 4 search engines as shown in later-described FIG. 1. These may require 200 keyword sets, and 10 ad spots, resulting in 8,000 possible combinations just for one product. Assuming a company sells 25 products, there will be 200,000 CPC bids to be evaluated at a certain frequency to gauge their impact on the seller's business targets of revenue, profit, and inventory. To make matters more difficult, the pricing of the product also need be determined in conjunction with such CPC bidding to optimize such targets. If this task were to be performed, say, every 5 minutes, it is obvious that this is way beyond human capability. As a further data point, this example is very conservative since it is not uncommon for companies to have keyword sets which are in the thousands, and ad spots under consideration that could easily be 20 instead of 10, and the number of products could also be much higher, and with the evaluation frequency much better than 5 minutes, particularly in highly competitive markets.

Considering another example, that of display-based advertising, assume there are 50 web sites at which display ads will be shown, 200 keyword sets for contextual ads, and 25 products. (For non-contextual ads the number may be lower). This will result in 250,000 potential CPM bids to be considered once every few minutes or faster, in the context of various targets and the product price to be offered to optimize such targets,—again, however, clearly not a manual task. The difficulty is further compounded if pricing is subject to the lead source, and even worse when taking video or mobile channels into account for such display ads.

A seller, furthermore, has to make both search-engine and display ad based decisions of the magnitude described in the above examples in a very short time frame and on a continuous basis, 24×7, 365 days a year, with clearly inherent and significant financial risks involved.

Search engines, such as Google and Yahoo, however, do provide some tools to enable visibility in their own respective worlds; for example, 'Google Adwords' provides excellent reporting on how many overall impressions in a certain time frame occurred, how many clicks/keyword, breakdown by region, and a conversion tracking report. This is, however, non real-time reporting, and while very useful at macro level, is intended to be manually analyzed to have better understanding of the trends, and is not meant to be used for real-time, on-the-spot decision-making by the seller. Google also provides an estimated CPC for certain keywords with an explicit assumption that the current bid pricing trend will continue; however, as the market is immensely competitive and ever changing, the company can not guarantee it. In addition, while a seller may also request a specific spot in the display page, for example between 4 to 7, Google can not, however, guarantee it, and it takes a few days to take effect— once again, not meant to be used for bid-by-bid response decisions. While Google's 'Adword Configurator' allows a seller to set an upper limit on the daily budget and a maximum CPC bid, unfortunately, the ad's placement position is unpredictable, resulting in a wide margin of error between what is received and the actual need of the business targets.

Similarly, Google's tool to assist display ads—known as 'AdSense'—provides infrastructure to deliver ads to the web sites. This is, however, independent of the seller's unique business targets and has nothing to do with how expenditure impacts upon them.

Until the advent of the new techniques of the present invention and of said copending applications as used therein, the seller has been and is currently faced with the following limitations:

(1) No means available automatically to optimize its time-sensitive business targets such as profit, revenue and inventory in real-time and in response to dynamic market conditions, and all without any manual intervention, resulting in further decline in the efficiency of the operation, already under squeeze due to intense competitive seller pressures.

(2) No ability automatically to adjust its relative degree of emphasis among various targets (at times in conflict with one another) as a function of what is left to be filled, and how much time is left to meet the targets.

Consider a scenario, for example, where a seller may be more focused on profit earlier in the quarter, then shifts to revenue as that target may fall behind by the middle of the quarter, and then shifts to inventory reduction towards the later part of the quarter, such as, for example, a swimsuit in northern climates declining in value by late August due to the upcoming winter season. In another scenario, as the seller shifts the emphasis from profit to revenue by making appropriate price adjustments and promotions, the revenue may pick-up nicely and the seller may thus go back to emphasizing profit; and so on. The key is to precisely manage this process on 24×7, 365 days a year; but unfortunately, the seller can only attempt to do it and on a manual basis at that—resulting in wide variance from any optimized solution.

How to price, what to price and when to adjust the price is a continuous struggle for a seller. Typically, there are two ways to compute the price, using one's own acquisition cost as a basis, or base it on highly variable competitive prices or a combination thereof. Unfortunately, as the competitive prices vary quite a bit as a function of time, across hundreds and at times thousands of geographically dispersed competitors, it is very difficult manually to keep track and make appropriate adjustments 24×7. Each seller knows its own cost, and has some information about competition prices; however, when faced with hundreds or thousands of competitors on web, there are no tools available to discover in real-time the price the market will bear for each of its products in order to optimize the seller's unique targets.

While there are, however, some prior art software tools available which operate in batch processing mode and largely use historic data to recommend the price, these tools, unfortunately, suffer from a fundamental flaw; using its own price to predict the future price means one could be potentially leaving significant money on the table, or one is over-pricing, resulting in reduced sales. Historic prices have not thus been necessarily a good predictor of the future price, especially in the web-based market place with thousands of sellers, and such results in huge variance from optimum pricing.

(3) Difficult to avail the opportunity to price the same or essentially the same products as a function of the source of the lead, such as multiple search engines, and display ads ranging from high-end magazines to a daily newspaper. The seller today not only lacks this ability to price correspondingly for each one, but also cannot update them in real-time, 24×7, as the market conditions evolve.

(4) Difficult to determine how much to reduce price for each product during a promotion. This decision can have a significant impact on financials. This is typically and historically, where the most money is left on the table; or the reduction is not sufficient, resulting in lack of sufficient customer traction. As an example, if a retailer could get away by having only 20.5% reduction in price versus 25%, that is a big deal, considering that most retailers operate at 3 to 4% margin. Any prior art manual effort to optimize in a dynamic market with a large number of geographically dispersed competitors on web is a hopeless task, with a wide margin of error. Unfortunately, again, there are no real-time tools available to assist sellers in this respect either.

(5) Challenge faced by the sellers is what should trigger a promotion, and when should it stop. Currently, most sellers typically use holidays, beginning and end of the season, and inventory reduction, as reasons to run promotions for a fixed number of days. This approach, however, is highly sub-optimum, as the need to trigger a promotion and its duration are not tightly coupled to the business targets, and often result in either leaving too much money at the table or not gaining enough traction. There has been no automated means available to seller (prior to the present inventions) to accomplish this task in real-time.

(6) No ability automatically to compute and adjust the price when reaching a point close to a supplier's break, it being very difficult, if not outright impossible, for the seller manually to watch, 24×7, for each product as the products reach closer to a supplier's break, in order quickly to reduce the prices appropriately in order to accelerate towards the threshold; and once that target is reached, then revert back to normal process.

A seller's decision to advertise, thus, is neither always driven by, nor is it always necessarily in sync with, its overall time-sensitive targets or the current status of these targets. Furthermore, it is very challenging and cumbersome to determine for each product in a seller's portfolio, when to advertise and for how long, or what is the trigger to stop the advertising. When a seller has multiple products to offer, moreover, the challenges amplify further. Typically, therefore, the seller assigns a budget, and provides it to the likes of a Google, who then tries to spend it the best they can. Unfortunately, as discussed previously, Google and the like has nothing to do with the seller's unique business targets, and is not even aware of the current status of such targets. Thus, there is a serious disconnect.

(7) Slow and erratic response time to dynamically changing market conditions. No means available continuously to evaluate the dynamic market conditions, their impact on the unique business targets, and with subsequent ability swiftly to react to alter the course appropriately. As an example, if perishable inventory reduction is not occurring at an anticipated pace, then there may be a need quickly to trigger a promotion in order pro-actively to get the inventory in line so as to avoid major losses at the back end. This promotion, furthermore, will require additional decisions, such as how much reduction in price, how to advertise the promotions, and the cost to advertise against the gains anticipated. Another example is the case of a seller who actually manages to get the desired placement with the right CPC bid. Such is only good, however, until someone else makes a better CPC bid among hundreds or thousands of other advertisers and/or competitors. In fact, a desired ad placement may not even last for a minute; hence the need for 24×7 monitoring and very quick decision making, both incompatible with current manual processes, but provided by the automation of the present invention. Seller has no means available to automatically determine an optimum price which will result in optimized time-sensitive business targets in real-time in response to dynamic market conditions, and without any manual intervention.

(8) No tools currently available in real-time which can automatically compute the optimum product price synergistically with appropriate CPC bids in a manner such as to optimize the fulfillment of the time-sensitive unique business objectives such as, for example, a retailer's profit and revenue targets, product inventory management, and the ability to avail of a supplier's break.

(9) No automation; typically the placing of a bid is currently a manual process or via manual tools and operates in non real-time, requiring 24×7 supervision and support and associated expenditure on part of the advertisers.

(10) Such bid computation methods have large margins of error and are at the expense of either lost clicks or over payment.

(11) Lack of synergistic coupling along with the request of manual analysis and in non-real-time, results in an unpredictable outcome with large variance to the business targets. As an example, if a seller spent most of its advertising money in the early part of the quarter, and, unfortunately, due to various reasons, could not reach close to its revenue target or its profit target near the end of the quarter, then it is stuck with no ability to alter the outcome, even using advertising as a tool to attract more traffic. On the other hand, if the seller was doing brisk business earlier in the quarter, and by the middle of the quarter is closing in on its targets, then it may want quickly to reduce the CPC/CPM bid sufficiently in order to save money.

(12) Similarly, a seller stuck with significant inventory, such as outdoor cooking grills in mid-September in northern climates, does not have much chance to sell them in winter and is forced to substantially increase its advertising expense by raising its CPC/CPM bid while making significant product price cuts, resulting in loss of capital. The seller today, due to the current lack of any real-time automated tools, and absent the present invention, is resigned to this narrow inventory-centric ad-hoc approach, instead of a continuous pro-active time-sensitive tight inventory control, synergistic with the other key business targets.

(13) Requirement for manual triggering of very short term advertisements for each product whenever an opportunity arises to avail a supplier's break. Given the number of possible web-based channels running into hundreds of thousands, however, it is not possible for the seller to evaluate the optimum manner to accomplish such goals with the least amount of expenditure in order to take advantage of such an opportunity.

(14) The advertiser does not have the ability quickly to create event-driven promotions synergistically with the seller's unique business targets. As an example, if a product such as a video game console is in high demand, as evidenced by a sudden surge in clicks late in the evening or early morning, the best course of action is instantaneously to examine the inventory, trigger higher CPC bids to secure the best possible placement to derive the maximum benefit so long as the inventory lasts, and then dial down the CPC bids right away to minimize further expenditure. A seller today, however, has no such luxury. Similar limitations apply to web-based display ads.

(15) The high risk of much greater expenditure than originally anticipated in case of open-ended CPC bids participation using estimated numbers; and the same for CPM bids.

(16) The risk of getting fewer clicks than anticipated when working within a budget, due to fierce and unpredictable competition that results in higher CPC than originally estimated. Clearly, this will also result in curtailed duration in which the seller was at the desired placement, bringing it back to reduced visibility sooner than anticipated. A similar situation exists with display ads.

(17) No ability to make the optimized product pricing decisions instantaneously to adapt to dynamically altering competitive pressures reflected by significant variations in the CPC bid prices over a short time interval.

For the seller, indeed, all these limitations are further compounded due to multiple search engines, multiple product lines, hundreds, or at times thousands of sets of keywords and corresponding CTRs, and the dynamic nature of CPC bids. How, in real-time, to pick the right search engine/s for each product for each set of keywords, and the right ad placement such that contribution to unique business targets is optimized with minimum CPC expenditure, remains an elusive and unsolved problem. A seller today has no option but manually to decide such immensely complex issues, resulting in large margins of error. Similar challenges are posed when display ads need be placed across numerous web sites, multiple product lines, hundreds, or at times thousands, of sets of keywords for contextual ads and corresponding CTRs, and all under the dynamic nature of CPM bids. How to pick the right web sites for each product for each set of contextual keywords, such that contribution to unique business targets is optimized with minimum CPM expenditure, remained an elusive and unsolved problem until the present invention. A seller had no prior option but manually to decide this immensely complex issue, resulting in large margins of error.

(18) These complex challenges are further exacerbated as a seller has to make decisions about not only search engine-based advertising, but also display ad based advertising over web sites, simultaneously. The seller is required to evaluate numerous channels, numbering at times in hundreds of thousands as described in earlier examples, and dynamically select the ones which will optimize contribution to its unique business targets. The seller, unfortunately, has had no option here either, and is forced to make manual decisions resulting in significant margins of error and adverse impact on the business.

(19) The seller is now facing emerging additional media channels including mobile and video, further adding fuel to the problem.

(20) The seller has no choice but to make a CPC bid in advance, not knowing the quality of the incoming search request (lead). As an example, a car dealer does not want to be billed by the search engine for someone looking to get an expensive sports car, but yet does not even have a license; the dealer, however, does not get that option.

TV Advertising

Advertising on TV is roughly $70 to $80 billion dollar industry per year. Networks (this includes broadcasters such as CBS, NBC, ABC, cable content providers such as CNN, ESPN, satellite providers such as Dish Networks and Direct TV, local TV stations, and so on) typically sell around 70 to 80% of the advertisement slots in the May to June time frame for the new season starting in the fall. Remaining slots, also called 'Scatter', in general, are sold later. Cable has a higher Scatter number than Broadcasters. In industry jargon, a linear sequence of commercials is called 'POD', and each commercial slot is identified by its POD number coupled with its location within the POD. Some such slots are sold directly to the advertisers; some are negotiated with ad agencies representing a pool of advertisers; and some are purchased by the ad agencies themselves as wholesalers to be resold later. Ad agencies collect significant fees for rendering their services and also derive immense benefits by purchasing the slots in bulk and subsequently selling them piecemeal. The TV shows slated for fall onwards are first previewed by the advertisers and the advertising agencies. The advertisers, such as, for example, Toyota, Wal-Mart, and P&G, and various ad agencies then analyze such shows based on predicted demographics by the networks and their own perception of the kind of viewership the show may attract, and its potential magnitude. The demographics include, but are not limited to, age group distribution, geographic distribution, gender split, annual income distribution, and so on. Subsequently to this analysis, intense negotiations take place among all the parties, stretching over a few weeks, to buy the commercial slots. Given the large number of networks (300+), the hefty number of shows supported by each such network, associated respective unique anticipated demographics, and the correspondingly huge number of commercial slots, these negotiations involve significant manpower and time to review. Such review involves making preliminary selections, negotiating and finalizing the shows and corresponding prices for such commercial slots. As a perspective, some large companies have TV advertising budgets ranging from $100M to $300M per year for the United States only. For a multi-national company, the global budgets are even higher and their allocations even more challenging and time consuming.

To put this further in perspective, assuming there are 300 individual channels on TV, each having roughly 6 hours worth of advertising per 24 hours, with each slot measured in 30 seconds intervals. There are, therefore, approximately 216,000 thirty-second slots every day, resulting in around 78 million slots in a year, and this is just for a region within the same time zone. There will be some differences across regions within the same time zone, and then there are differences across the time zones, thus further increasing the number of slots just for the United States.

This immensely complex and thus intensely negotiated pricing process must be done manually today and not automatically, and it suffers from the following limitations:

(1) Predictions and corresponding financial commitments need to be made in advance, for each show, and even slots within the show, such involving an extremely speculative process with very high margins of error—even more difficult for new shows. It is basically a shot in the dark and not much different than predicting success of a yet-to-be-released Hollywood movie. Even for an existing show, it is difficult to project if the viewers will continue to like it and to what extent.

(2) The demographics of a program is greatly influenced by what other shows are being presented at the same time slot. A reasonably popular TV program last year, indeed, may do poorly in the coming year if placed against a popular competing show.

(3) This involves a highly inefficient and extremely expensive and time-consuming negotiating process.

(4) The advertiser is challenged with a very complex decision-making process due to the sheer magnitude of the task and the vast amount of money involved.

(5) There is no easy way to change or correct the ad dollar allocation once a commitment is made, regardless of the performance of the show—typically, it's a roll of the dice.

(6) There is no easy way to attract the right demographics if the predictions do not match reality,—a frequent phenomenon, particularly where these programs are shot in advance.

(7) As the performance measured in terms of demographics is unknown in advance, its actual impact is known only after the event—a fete accompli, indeed. This is true even for weekly serials such as the popular 'According to Jim', where the performance varies quite a bit on a week-by-week basis depending on the plot and what else is being shown on TV, including sporting events of often unpredictable duration.

(8) Such performance, moreover, can vary significantly even during the presenting of a show. A 90 minute show, for example, may see viewership decline if another popular show or a major sporting event starts some minutes after it began; or conversely, the viewership increases, if another popular show finishes during this show].

(9) The performance of a show, in terms of demographics, furthermore, is also a function of the theme and of the popularity of the shows preceding and following it.

(10) The problem is further complicated as each time zone may not necessarily have the same scheduling. For example, the east and west coast may have the same program, scheduled several hours apart to reflect such time difference, while other programs, such as live sporting events may be presented at that same time on both coasts, producing very different competitive demographic impacts on the two coasts.

(11) Another challenge faced by the advertisers in predicting demographics is that some advertisements are regional in nature, for example, resulting in different entities advertising in the same show in different regions, even within the same time zones.

(12) Advertiser's decision-making is further compounded since the program scheduling is not always fully settled in advance, as to the time of the day and day of the week, thus making it hard to evaluate its expected performance.

(13) While all these challenges make it difficult enough accurately to predict the demographics for a show in its own right (not to mention variations during the show impacting the PODs), it is next to impossible to predict such where there are potentially 300+ shows presented at the same time slot, each with similar varying degrees of uncertainty.

(14) For an advertiser, it is therefore extremely difficult to come even close to predicting the aggregated demographics for each of the desirable categories for each of its products as measured against the total advertising money spent.

While it is highly desirable to optimize the demographics against the advertiser's budget, given the huge range of possible outcomes based on the inherently widely inaccurate predictions, this is extremely challenging. The overall measurement and performance analysis post show, moreover, in terms of demographics received against the money spent per slot by the advertiser, also involves an on-going very cumbersome process.

(15) There is disconnect, furthermore, between speculative advertising commitments made by the advertiser in advance, and its unique quantitative business targets over a pre-specified time interval, impacting a dynamic and unpredictable relationship between advertising commitments and targets. The problem is exacerbated as the relative degree of emphasis among such targets evolves with time.

(16) In the current present-day approach, not only do the advertisers suffer, but the networks also do not collect the maximum value in view of this tenuous relationship between actual performance and the money paid by the advertisers.

(17) Neither networks, nor advertisers can sort demographics in advance due to the inherent inability to predict reachability to a certain age group of a pre-defined number of viewers of sought-after gender and annual income.

(18) Thus, in today's approach to these problems, neither the advertisers, nor the networks derive the optimal advantage; and the biggest beneficiary is the ad agencies who are the middlemen, rendering the overall process highly inefficient.

There have been recent efforts, therefore, by companies such as Google, to buy advertising slots in advance in bulk from the likes of 'Dish Network', and then auction them off during the season to advertisers, effectively acting as an advertising agency with a different twist. Advertisers bid in advance and the winner is notified 24 hours in advance of the placement of its ad; but the network it will be on, and the time slot, remain unknown. The winning advertiser, moreover, is informed of the demographics only after the show is over. While this approach improves a bit upon the previously described process of advance purchases in a number of ways, it also makes it worse for the advertisers. The limitations are largely the same as presented above, but with some differences appropriately noted:

(1) Unpredictability of the type of slot or show received on part of the advertiser.

(2) Inability to ensure repeatability of the message. An advertiser typically wants to advertise to similar audiences on a repeated basis, in order to achieve a higher level of influence.

(3) Unlike the previously described process where an advertiser could buy a fixed number of slots per show for a pre-determined number of shows or duration, here the advertiser has no ability to plan an advertising campaign. An advertiser requiring some committed slots across the same show for a few weeks for example, would have no such planning capability.

(4) The advertiser has a much higher exposure on the budget side and much higher risk of having spent money in an unplanned manner.

(5) Predictions and corresponding money commitment need be made about each show and slots within each show, 24 hours in advance, clearly a speculative process with high margin of error, and even worse for new shows. Even for existing shows, it is difficult to project if the viewers will continue to like it and to what extent.

(6) The demographics of a program are again greatly influenced by what other shows are on at the same time slot. Since Google does not provide the show or the corresponding time slots until 24 hours in advance, there is absolutely no ability to work around a more popular competing show on another channel, resulting in an inefficient, expensive, and time-consuming process.

(7) The advertiser is challenged with a very complex decision-making process due to the sheer magnitude of the task and the vast amount of money involved.

(8) As the performance measured in terms of demographics is unknown in advance, its actual impact is known only after the event and is difficult to extrapolate from the results of its previous showing, as its performance is also going to be a function of the theme and popularity of the shows preceding and following it.

(9) The advertiser lacks the ability to optimize across various networks and shows simultaneously, and is thus forced to settle for a highly unknown outcome, while paying maximum auction price. Neither the advertisers, nor the networks derive the optimal advantage; similarly to the ad agencies, the biggest beneficiary is a Google.

There are, moreover, also some serious limitations introduced by the auction process itself, such as Google's 'Time-Constrained' auction process in which the auction is terminated at a pre-defined time. A large percentage of participants, however, typically bid late in such 'time-constrained' auctions. This is due to a number of factors including, but not limited to, network interface speed, network delays, machine delays, and human capacity to react and (type in) a bid, and so on. A good example of such, is that of eBay. At the termination time, the highest bid closest to the termination time is declared the winner. Any number of bids received after the termination time, even if delayed by but a few seconds, are discarded, independently of how high they were compared to the winning bid closest to the termination time.

As the auction is artificially terminated at a pre-determined time, even when there may be one or more advertisers ready and willing to make much higher bids, but suffering severely loaded network connections or heavy internet access, the adverse impact can be significant.

This 'Time-Constrained' method of auction, moreover, encourages a large number of participants to jump into the fray near the very end of the auction, resulting in high order of uncertainty and making the outcome far less predictable.

As the number of bids surge in the last minute or two, indeed, an advertiser does not have sufficient time mathematically to analyze and logically react, especially when multiple such auctions are on at the same time, and is forced to treat each auction in its own right instead of optimizing across all the auctions.

The seller, in this example, Google (and in effect the network/s), thus frequently will not receive the full value it could have, if the process had been allowed to continue so long as there was more than one bidder willing to improve the bid.

This sub-optimum 'Time-Constrained' rather than 'Highest-Bidder-Centric' approach, has this fundamental flaw, making it inherently unfair for the participants.

In summary, thus, in today's web-based on-line advertising, an advertiser (seller) not only faces limitations as outlined above in detail, but it also has today the manual challenge to determine how to allocate the overall budget among these media types and sub elements within each.

To address these and provide an automated solution, the novel approach of the present invention will now be described with reference to the preferred use of the tools of the before-mentioned ARTIST automatic apparatus and method for commercial auction over the internet in a multiple-buyer, multiple seller market place of said co-pending application Ser. No. 11/367,907 and the automatic engine architecture and component (SAEJ) of said copending application Ser. No. 11/880,980 that enables the achieving and optimizing of the seller's pricing and other unique business objectives and goals. In such setting, the present invention provides a novel architecture that enables synergistic decision-making among very many moving parts, such as pricing, promotion, availing of supplier's break, and advertising allocation, so as to optimize the seller's particular business objectives and targets.

As explained in the above-cited copending ARTIST US patent application, despite development of Internet web search engines and web crawlers for trying to match buyer requests with seller offers, the prior art had not yet provided, before the invention of that copending application, a practical method of automated communication between buyers and sellers that allowed for truly free marketplace interaction. This ARTIST approach involves, as before stated, an automated real-time iterative reverse auction system and mechanism consisting basically of a buyer system component (BS), a reverse auctioneer controller component (RAC), and a seller automated engine component (SAEJ).

In general, in current on-line and off-line marketplaces, it is the buyer's burden physically and manually to decide such questions as what is the best price and what and where and when such is available; who is a trustworthy seller; how to maximize discounts using coupons, promotions, purchasing history etc; how to make multiple sellers compete with one another to get the best price; and how to obtain the benefits of aggregated spending, and volume and historic purchasing power leverage. In addition, in case of multiple goods and services, possibly being shipped to different addresses, there is apparently no existing solution, save the invention of said copending ARTIST application and the present invention, for automatically finding the best combination of sellers to provide such a best price. The details of designs, circuits and block diagram implementations of said corresponding ARTIST and said SAEJ copending patent applications are incorporated herein by reference, and are not here reproduced in order not to confuse, complicate or distract from the disclosure of the present invention directed to dynamic automatic advertising allocation determination in the context of the unique seller's goals and targets, and in more general and other applications as well.

As for the sellers, the challenges and questions include generally how to access a larger addressable market without spending large sums in advertising, manpower and capital expenditure. Important further questions, among others, include how to price, what to price and when to update the price; how automatically to compute an optimal price in real-time in automatic reverse auctions; and how iteratively to bid so as to sell the product at the optimal price. The seller thus face the challenge of finding an optimal pricing strategy which is particularly unique to their own constraints, while meeting their unique and personal business targets in specified time intervals. This is achieved with automatic seller optimization techniques and with a choice of options for improved automated seller engine architecture implementations (SAEJ) depending upon the particular application involved, as detailed particularly in said copending application Ser. No. 11/880,980.

A Summary of the ARTIST Concept

As before stated, in the ARTIST automated real-time iterative reverse auction system, a unique and innovative solution is provided for buyers and sellers, wherein a reverse auction controller (RAC) receives buyer requests and solicits iterative bids from sellers equipped with seller automated engines (SAEJ) that respond to each iterative bid request (as part of an auction) in real-time with the optimal price available from the seller at that instant. The seller automated engine (SAEJ) not only provides the buyer with its best price, but also optimizes the price based on the seller's objectives. The before-mentioned combination of automated real-time iterative bidding, the reverse auction controller and seller automated engines, addresses the challenges faced by sellers.

A generic automated seller engine (SAEJ) that enables the addressing of many of these challenges and without manual intervention, is described in said co-pending ARTIST application Ser. No. 11/367,907, Publication US-2007-8020830-A1, and is also summarized herein; disclosing how automatically to track competitive pricing; how to be agile in responding to changing market conditions; how to set and to advertise such prices to entities outside of the target customers, such as competitors or other customers, and without requiring the customers to register on a seller-specific system such as the seller's web site; and how to achieve all of the above goals simultaneously while changing the priority of each goal based on current market conditions.

As earlier stated, for certain market conditions or time periods in the sales cycle, for example, profit margin may be more important than revenue; while during other sales periods, the reverse may be true. The invention addresses how to achieve all of the above goals simultaneously without manual intervention each time the price has to be adjusted to achieve the goals in the presence of dynamically changing market conditions; and also how to achieve all of the above goals simultaneously without waiting for offline tools to gather market data and adjust pricing subject to high estimation errors over the period of a week or month or more; and how to achieve the above goals simultaneously without being required to predict future market conditions—indeed, achieving the above goals simultaneously by changing pricing in real-time.

These functions are attainable with the generic automated seller engine (SAEJ) described in said co-pending ARTIST application Ser. No. 11/367,907, and without manual intervention; and improved and optimized architectures for implementation of the SAEJ are presented in said copending application Ser. No. 11/880,980, summarized below.

A Summary of Improved SAEJ Concepts

SAEJ architectures that are particularly useful with the present invention, may have multiple possible implementations that include a parallel processing architecture, or a pipeline architecture, or a hub and spoke model, or also a hybrid combination of the above, as explained in said application Ser. No. 11/880,980. The core idea is to implement a price management unit that is responsible for receiving requests from the controller (RAC) for one or more items that the buyer expresses interest in buying. It also receives input from the system in the sense that it is apprised of what the market data is; it knows for existing products what the historical prices are; and it is also configured by the seller engine itself that enters the business objectives of the seller user—that is, the specific terms of targets or goals and the constraints that the seller enters into the system. Based on the type and the values of these goals that the seller enters into the system, the price management unit optimizes the price for the business objectives of the seller, providing specific implementations of how automatically to optimize the price, (1) for specific target-directed implementations, (2) for market-share directed implementations, (3) for utility derivative-following implementation, and (4) for model optimizer implementations, the invention also providing a novel mathematical optimization-oriented implementation, more generally.

OBJECTS OF INVENTION

A principal object of the present invention, in perhaps one of its broader applications, accordingly, is to provide an improved system for and method of optimizing quantative business objectives of sellers (advertisers), synergistic with the seller's pricing, promotions and advertising program, while simultaneously minimizing expenditure in general, and the discovery and subsequent allocation of advertising channels for use in optimizing the attaining of the seller's business targets in particular.

A further object is to provide a novel system and method of this character that attain time-sensitive unique seller business targets such as profit, revenue, inventory management, assignment and management of their relative priority as a function of time, and means for reaching such targets with appropriate and automatic pricing and timely promotions and with synergistic tying-in and optimizing of dynamic allocation of advertisements among a myriad of media channels.

Another more specific object is to provide a technique for the introduction and implementation of a novel price management and seller price optimizing system in the before-described ARTIST type auction method and system of said copending applications, and similar systems, that enable automatic real-time iterative commercial transactions over the Internet in a multiple-buyer, multiple-seller marketplace, while automatically optimizing both buyer and seller needs based upon the dynamics of market conditions and the seller's unique inputted business objectives and constraints, and in response to requests from an auction controller for pricing bids on items that the buyer may request.

Still a further object is to provide for automatic, seller engine architectural implementations for use in such and related systems, to optimize the allocation of advertising budget to the various advertising media types to assure that desired demographics are reached for each media type to meet time-sensitive business objectives of the seller, monitoring the effectiveness of the ads, and making correct decisions, and in real-time for some media channels.

An additional object is to provide a more general automated novel method for advertising price management by select and novel mathematical and physical implementations for optimizing the advertiser's (seller's) advertising budget allocations under changing market conditions in real-time.

Other and further objects will be explained and described hereinafter and are more particularly delineated in the appended claims.

SUMMARY OF INVENTION

In summary, however, from one of its important aspects, the invention, in addition to benefiting buyers, provides a method of optimizing quantitative business objectives and targets of product or service sellers together with synergistic pricing, promotions and advertisements, including one or more of search engine-based advertising, Internet web-based on-line display advertising, and TV advertising, the method comprising, providing the seller/advertiser with an automated, adaptive, real-time SAEJ engine capable of determining the optimal price that the market will bear at any point of time, and capable of computing such price in real-time in order to optimize the sellers business targets;

evaluating the sellers advertising needs in the context of current CPC/CPM prices, of the status of said targets, and the current market conditions;

triggering advertisements in response to said evaluating, as and when appropriate, and computing bids in real-time, taking into consideration the expense associated with each bid, the current status of said targets, and the requisite pricing needed to optimize said targets; and causing the SAEJ thereupon automatically and optimally to allocate advertising selections in real-time, thereby to optimize allocation of advertising to achieve said targets while minimizing expenditure.

In connection with television advertising, particularly, the invention provides, in summary, a novel method of optimizing a sellers television advertising, to the benefit of both advertisers and television networks, that comprises, conducting a real-time competition and iterative on-line auction among would-be advertisers to win advertising rights for a commercial slot in the next POD for currently present TV shows over participating networks;

collecting actual real-time demographics and providing such to each participating advertiser in the auction; and automatically computing the bid price for the auctioning of the next slot of the selected show from such real-time demographics and from prevailing market conditions and within each advertiser's budgetary constraints as configured by that advertiser, such as to optimize the aggregating demographic targets over a pre-defined time frame.

Preferred architectures, and best mode-designs, apparatus and embodiments are later described in detail and in connection with the accompanying drawings.

DRAWINGS

In the accompanying drawings, FIG. 1 is a schematic diagram generally illustrating seller-search engine and consumer based interaction;

FIG. 2 presents an illustrative configuration involving a plurality of seller-advertisers with their respective SAEJs of the invention and a single search engine, whereas FIG. 3 shows configurational use with multiple search engines;

FIG. 4 illustrates a preferred SAEJ architecture of the invention that can optimize the seller's business target by computing optimal CPC/CPM channel selection, placement and pricing, as well as optimal product pricing;

FIGS. 5 and 6 are enhanced embodiments where the search engine sorts the incoming leads into various buckets, using a predefined criterion, and runs a CPC auction for each such bucket, FIG. 6 using multiple search engines;

Figure 1:
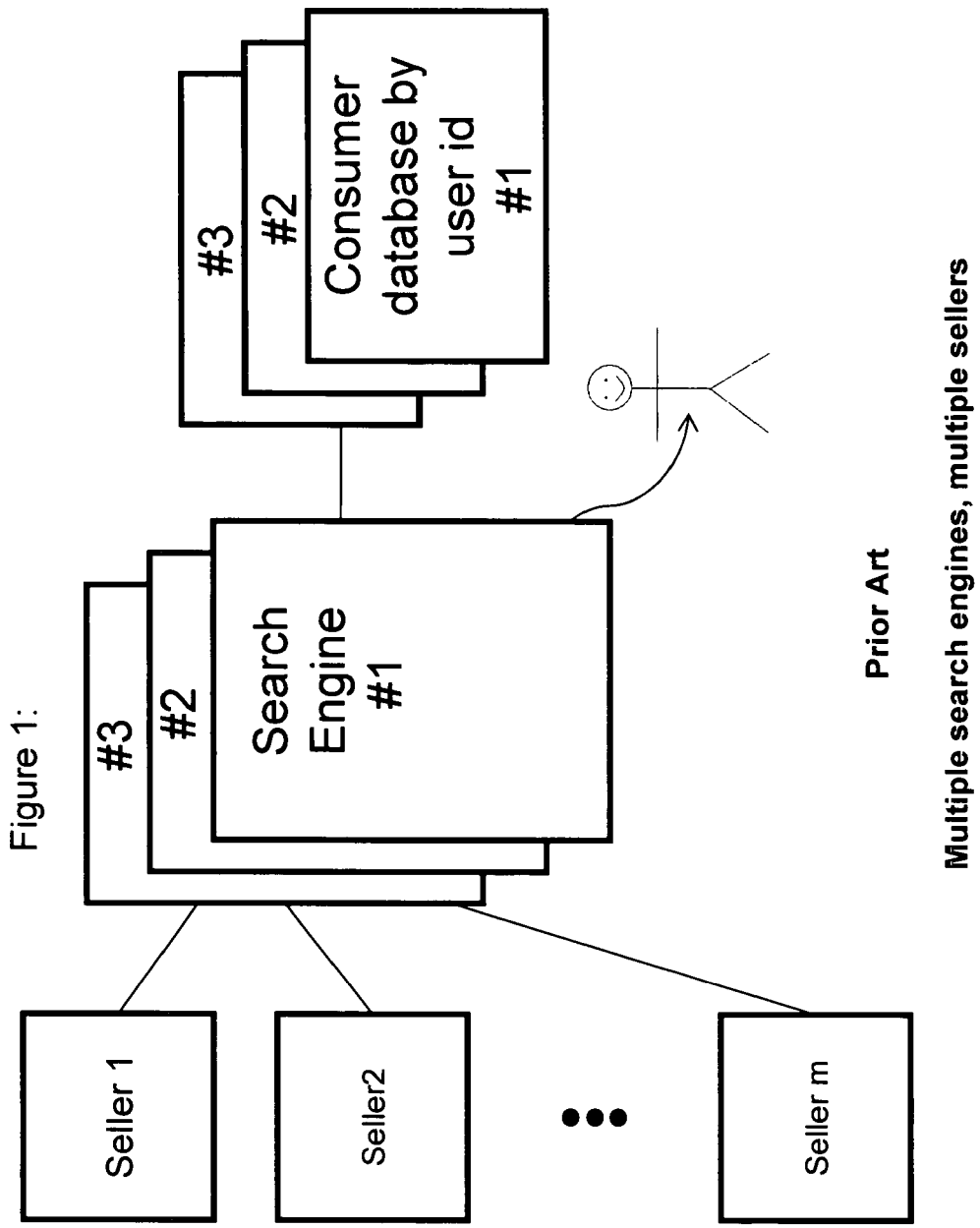

FIGS. 7 and 8 incorporate the associated lead characteristics (income level, region, age, etc.) in the search engine delivery of leads, with FIG. 8 using multiple search engines;

FIG. 9 illustrates the invention used for TV advertising and the like, with real-time evaluation of accurate demographics, iterative bids, and synergistic optimization of business targets; and FIG. 10 shows the integrating of different media types in a common SAEJ to provide additional optimization across all the media types while simultaneously minimizing expenditure.

DESCRIPTION OF PREFERRED EMBODIMENT(S) OF THE INVENTION

In the present invention, a seller (advertiser) uses the before-mentioned SAEJ, preferably as described in said copending patent applications, but merely schematically shown herein, but it being understood, as before stated, that it is intended to incorporate herein by reference the operational and implementation details of the exemplary components illustrated and detailed in the disclosures of said copending applications.

The SAEJ of said co-pending applications is an automated, adaptive, real-time engine with the ability to discover the optimum price that the market will bear at any point of time, 24×7, 365 days a year. It is also capable, as taught in said co-pending applications, of computing the price in real-time which will optimize the seller's unique business targets such as revenue, profit, and inventory, for a retailer. The SAEJ also has the automated ability to trigger planned or event-driven promotions and to compute corresponding requisite product pricing, within the constraints configured by the seller, to optimize the seller's targets. The SAEJ can also use historic bid response functions as described particularly in the cited copending application Ser. No. 11/880,980 such that pricing is a function of the source from which the lead originated. For example, if the lead came from a high-end luxury magazine, the seller could price products higher than usual—all performed automatically, in real-time and without any manual intervention, for each product and for each lead source.

The SAEJ can also be configured using its optimizers, as described in said application Ser. No. 11/880,980, particularly FIGS. 2-20 thereof which are intended to be as incorporated herein by reference to evaluate the advertising needs in the context of current CPC/CPM prices, the status of the business targets, the historic conversion rate, and the current market conditions, and so on. It will then trigger advertising as and when appropriate and compute bids in real-time, taking into consideration the expense associated with each bid, and also the current status of the targets in the context of time, and as described in said co-pending applications, the requisite product pricing needed to optimize the targets. Furthermore, the SAEJ is capable of automatically and optimally allocating advertising budget across several search engines and numerous desired display ad web sites and channels in real-time for each product, as later discussed.

As for obtaining automatic optimum pricing, the seller may use the 'Utility Derivative Following' approach described and detailed in the previously mentioned copending patent application Ser. No. 11/880,980, particularly in connection with FIG. 15 thereof, to find the optimum price the market will bear for each of the products. Another alternative is to use the 'Target Directed Approach', of said co-pending application, using exponential utility, linear utility or variations thereof, (FIGS. 8-10b thereof), subject to the seller configuration, using its own historic bid response function to establish unique pricing for each channel.

As an example, a product may be priced differently for each of the search engines, or depending on where the display ad click originated—sources such as the before-mentioned illustrative NYTimes.com, facebook.com, bankrate.com or high end luxury magazines. The SAEJ may also construct a historic bid response function (FIG. 12 of said co-pending application) based on a region. China or India, for example, may have their own historic bid response curves based on the product pricing in their respective local markets, which are very different from the United States. Each key word string, moreover, can also have its own bid response curve, enabling the seller to set prices unique to such key word set, and so on. All these methods operate automatically in real-time as taught in detail in said copending applications.

As for selling promotions, SAEJ is capable of running automatic short term promotions in real-time using the supplier's break optimizer, subject to seller configuration, when nearing a supplier's break, and without manual intervention. If an advertiser sells 1000 cameras costing $100 each, for example, then all the cameras from then on may be priced at say $90 from its supplier, and in addition the advertiser also receives $10,000 for retroactive sales. When nearing a supplier's break point, the SAEJ computes the optimum price within the seller-provided constraints, quickly leading it to the threshold in a manner net positive to the targets. Once the threshold is reached, the SAEJ will revert back to its normal mode.

Similarly, as another example, if a seller is stuck with a huge perishable inventory and there is but limited time to dispose of it, its SAEJ will automatically trigger a promotion coupled with the minimum requisite price reduction to bring the inventory status in-line, as per the seller configuration.

Figure 2:
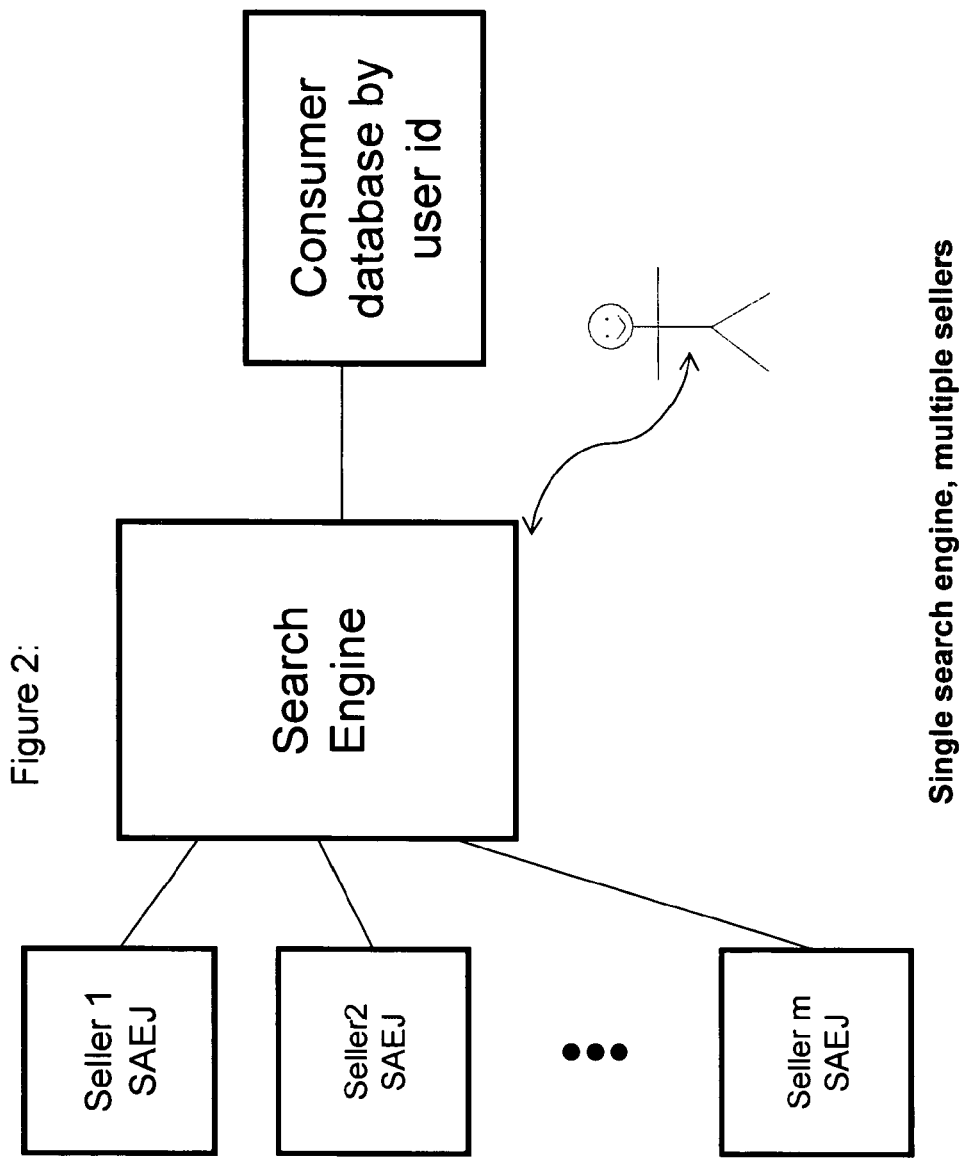
Figure 3:
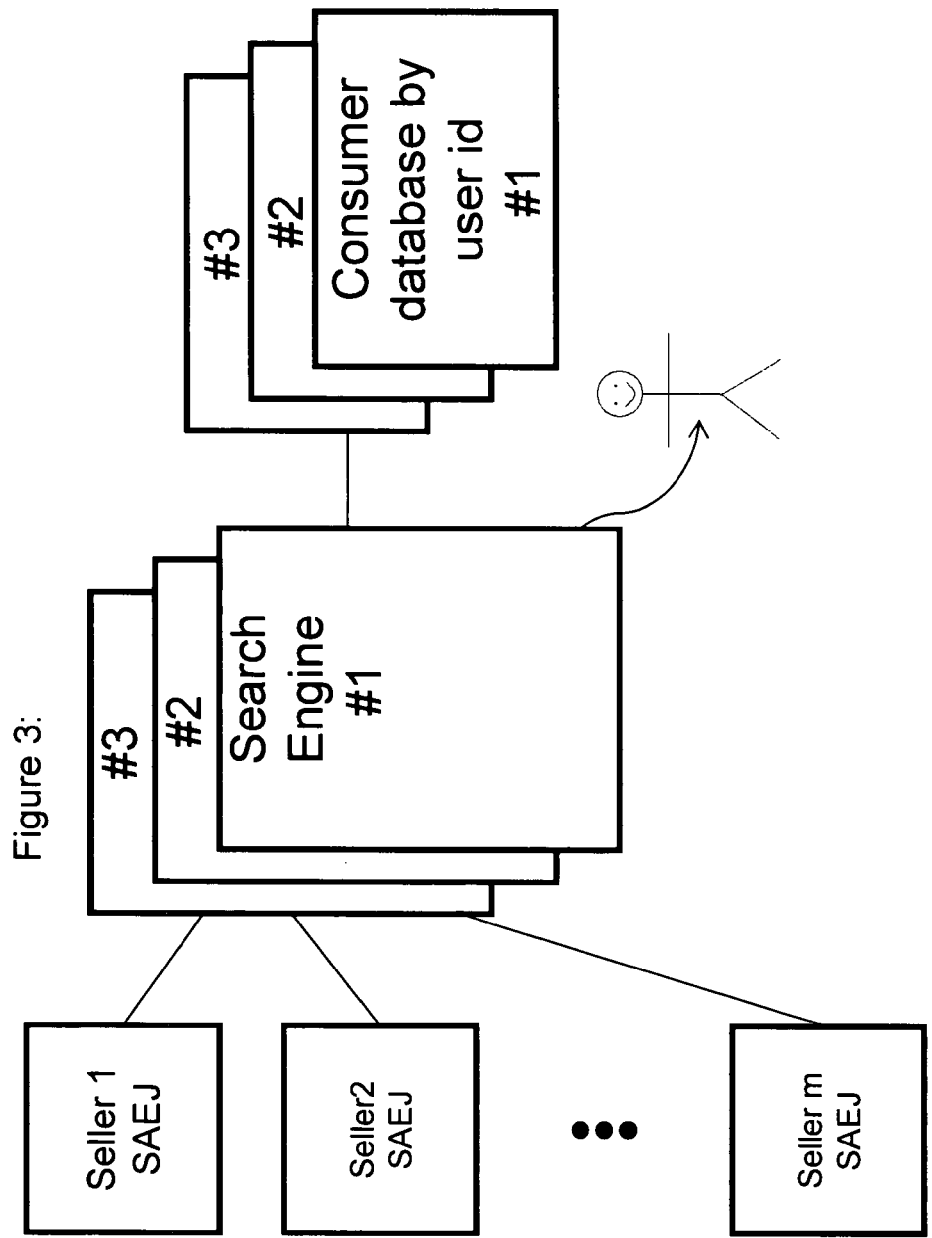

Turning, now, to the present invention and its web based on-line advertising, synergistic with attaining the seller's unique business targets, another key function performed by the SAEJ beyond the automatic price discovery, promotion, and optimization that is across sales targets, is the automatic computing of CPC bid values per product, per set of key words, per ad placement, per search engine in real-time, as a function of, and synergistic with, each of the CPC bid history, the prevailing competitive CPC pricing, the seller's unique time-sensitive business objectives and methodologies as reflected by the targets, and the methods chosen to approach such targets in a pre-specified time frame, the current status of such targets at that point in time, and the prevailing competitive market conditions impacting the value—and to do this in a manner so as to optimize such targets. A configuration involving advertisers with their respective SAEJs and a single search engine is shown in FIG. 2, hereof, and a configuration embodying multiple search engines is shown in FIG. 3.

Similar functions may also be performed for display ads in terms of CPM bids per product, per set of contextual key words, for each desirable web site, including over video and mobile channels, and for each region and other specified criterion.

The objective herein is to discover the optimum CPC/CPM bids across and among hundreds of thousands of possibilities, and to rank-order them according to the contribution made by each towards meeting the seller's unique targets, while simultaneously minimizing the advertising expenditure. This optimum CPC/CPM bid price is then anticipated to bring in corresponding clicks (leads), resulting in consequent business based on an expected conversion rate. The SAEJ, furthermore, may synergistically compute the optimum product price for such advertising campaigns to further optimize the above mentioned targets, and can adjust such product price automatically in real-time, as in said copending applications, even while the campaign is on.

Thus, the present invention not only provides the opportunity to price as a function of the lead source, using historic bid response functions described in said co-pending applications, but, the invention provides a key addition in tying this SAEJ capability to a "Click" on the results/sponsor links presented by the search engine to the user.

Using the example of a retailer, although the concept works across various market verticals, there may be weekly, monthly and/or quarterly targets for revenue and profit and simultaneously a need efficiently to manage time-sensitive inventory. As an illustration, when closer to a supplier's break, the SAEJ uses this information automatically to appropriately adjust its ad placement, the corresponding CPC bids, and/or to increase the number of display ads with corresponding CPM, to accelerate towards the threshold, and/or in conjunction with simultaneous reduction in the product price— all within the seller-provided constraints—to produce increased conversion rates to actual business from the clicks received. When such threshold is reached, then it subsequently reverts back to the normal computations mode of operation for both CPC/CPM bids and also that of product price, thus effectively running a very short-term automatic promotion. In the previously cited example of camera sales, the SAEJ will get aggressive in trying to receive more clicks once the number of cameras sold is close to, say, 1000—a seller-configurable parameter. Once 1000 cameras are sold, the SAEJ may cut back on this very short term, advertising blitz and special camera price, and revert back to its normal mode of operation as described earlier.

As the relative degree of emphasis among targets evolves as a function of time, and of the approaching distance to the targets, under dynamic market conditions, the invention provides that the CPC/CPM bids are continuously evaluated and correspondingly automatically adjusted in real-time to optimize such targets. As an illustration, if by the middle of a quarter, all targets are close to being met, then the SAEJ (subject to configuration) may choose to drive down the CPC/CPM bid quite a bit lower and across a much reduced number of channels and thereby save advertising expenditure. On the other hand, if it is late in the quarter, and the profit target is in good position due to earlier high margin sales, but the revenue target is far from being met, then, the emphasis shifts in a manner to take the least expensive corrective action to increase maximum revenue. In this case, the SAEJ may make higher CPC/CPM bids across more channels in order to secure more clicks, resulting in an accelerated opportunity of optimum revenue enhancement in a manner which minimizes expenditure. Simultaneously, this increased opportunity may be further capitalized on, by appropriately adjusting the product price within seller-configured constraints, and in a manner such as to further increase the odds of higher transaction completion rates, thereby enhancing revenue. This optimizes the ad dollars while making the expenditure synergistic with each seller's own unique business targets in real-time and without requiring any manual intervention and associated expenditure.

FIG. 4 illustrates a preferred architecture of SAEJ that, in accordance with the present invention, optimizes the seller's targets by computing optimal CPC/CPM channel selection, placement and pricing, as well as the before-described optimal product pricing of the copending applications.

An approach and formulation for the solutions for this problem or scenario will now be presented:

Given the following:
- Targets (profit, revenue, sales volume) for the period T
- Access to several search engine-based advertisement channels, such as the before-mentioned Google, Yahoo, MSN, Ask.com, etc.
- Each seller maintains a portfolio of predetermined keyword sets (assume, for example, that the portfolio is the same for all the search engines); and
- Each search engine provides the ability to bid for keyword-based ads to be placed in one of many ad positions, for each product, each search engine, and each keyword set in the portfolio, and for each ad position (basically the intersection of the search engine, keyword, and ad position):
- The search engine can provide the specific seller's Click through Rate and corresponding total traffic estimate. (This estimate could be a function of time of day, day of week, month of year etc.)
- The search engine also provides the current CPC market rate. This could be a fixed number (b), or in the form of the historic winning bid response function w(b), which is also a function of time.
- The seller can estimate the historic conversion probability as a function of search engine, keyword, ad position id, as well as a function of item price (p) and time.
- During any time period, basing on the seller's utility, the SAEJ must decide the following: "tuples" to bid on.
- How much to bid for each tuple.
- In addition, it must decide on the product price when a buyer clicks from each combination of these. The price may be further affected by the tuple specific price response function that can be measured by the historic conversion probability.

One constraint in the above, is that for each (search engine, keyword set) combination, only a single ad-position should be bid upon. The SAEJ may also be configured for a "daily budget" for each (keyword set, search engine) pair, given the selected ad position.

Using the search engine—provided feedback data specified above, based on the distance to targets (expressed as a utility function), as taught in said copending applications, the SAEJ may continually evaluate (search engine, keyword set, ad position) tuples as well as the optimal bid price and the optimal product price to get to the selling targets. The SAEJ is thus continually optimizing; where, how much, and what promotions to run as well as how to price, based on the seller's unique business objectives. This requires no manual intervention from the seller after the configurations above have been set.

Exemplary Formulation for Invention

The problem is formulated as a mathematical cross channel optimization problem as follows:

Let index i denote search engine, j denote key word set and k ad position, with the variables defined as follows:
- $x_{ijk}$: integer 1 or 0. When engine i, key word j and position k is chosen, it takes value 1; otherwise it is 0.
- $b_{ijk}$: bid price for tuple (i, j, k). It is a function of time t.
- $w_{ijk}(b_{ijk})$: winning probability for tuple (i, j, k) at bid price $b_{ijk}$.
- $p_{ijk}$: item price if the click through is from tuple (i, j, k). It is also a function of time t.
- $\rho_{ijk}(p_{ijk})$: probability to purchase the items at unit price $p_{ijk}$ when the click is from (i, j, k).
- $Q_{ijk}$: number of items purchased when the click is from (i, j, k).
- $n_{ijk}$: total traffic rate (number of impressions per unit time) of tuple (i, j, k), a function of time t.
- $r_{ijk}$: click through rate for tuple (i, j, k). It is the probability to click on an impression, also a function of time.
- C: fixed cost per item.

The expected total cumulated revenue, profit, and sales volume up to time 'e are calculated as:

$$R(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)] p_{ijk}(t) dt \quad (1)$$

$$M(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)][p_{ijk}(t) - C] dt - \quad (2)$$

$$\sum_{i,j,k} x_{ijk} \int_0^t n_{ijk}(t) r_{ijk}(t) w_{ijk}[b_{ijk}(t)] b_{ijk}(t) dt$$

$$S(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)] dt \quad (3)$$

The utility of the seller at time t is $$u(t) = w_R u_R(R(t), R_T) + w_M u_M(M(t), M_T) + w_S u_S(S(t), S_T), \quad (4)$$

where
$u_R$: Revenue utility function
$W_R$: Revenue utility weight
$R_T$: Revenue target
$u_M$: Profit utility function
$w_M$: profit utility weight
$M_T$: Profit target
$u_S$: Sales volume utility function
$w_S$: Sales volume utility weight
$S_T$: Sales volume target The seller's objective is to come up with the function forms of $b_{ijk}(t)$ and $p_{ijk}(t)$ and parameters $x_{ijk}$ to maximize utility at the end of the period (t=T), which is formulated as $$\max_{x_{ijk}, b_{ijk}(t), p_{ijk}(t)} [u(T)] \quad (5)$$

The first constraint in the formulation is set as:

$$x_{ijk} = 0, 1 \quad (6)$$

The before-stated constraint that for each (search engine, keyword set), only a single ad-position should be bid on, can be expressed as $$\sum_k x_{ijk} \leq 1 \quad (7)$$

Other business constraints (e.g. bid and item floor and ceiling prices) can be added, accordingly.

If there is no advertisement budget constraint, the optimal ad budget can be calculated for each tuple (i, j, k) once the optimization problem is solved.

Otherwise, the budget constraints can be added as follows:
Ad position budget constraint can be expressed as $$\sum_{i,j} x_{ijk} \int_0^T n_{ijk}(t) r_{ijk}(t) w_{ijk}[b_{ijk}(t)] b_{ijk}(t) dt \leq B_k \quad (8)$$

The total budget constraint is $$\sum_{i,j,k} x_{ijk} \int_0^T n_{ijk}(t) r_{ijk}(t) w_{ijk}[b_{ijk}(t)] b_{ijk}(t) dt \leq B \quad (9)$$

The above formulation is based on CPC (cost per click). A variation of the formulation could be based on CPM (cost per thousand impressions). The expected total cumulated revenue, profit and sales volume up to time t may then be re-calculated as $$R(t) = \sum_{i,j,k} x_{ijk} \int_0^t Q_{ijk} n_{ijk}(t) w_{ijk}[b_{ijk}(t)] \rho_{ijk}[p_{ijk}(t)] p_{ijk}(t) dt \quad (10)$$

$$M(t) = \sum_{i,j,k} x_{ijk} \int_0^t Q_{ijk} n_{ijk}(t) w_{ijk}[b_{ijk}(t)] \rho_{ijk}[p_{ijk}(t)][p_{ijk}(t) - C] dt - \quad (11)$$

$$\sum_{i,j,k} x_{ijk} \int_0^t n_{ijk}(t) w_{ijk}[b_{ijk}(t)] b_{ijk}(t) dt$$

$$S(t) = \sum_{i,j,k} x_{ijk} \int_0^t Q_{ijk} n_{ijk}(t) w_{ijk}[b_{ijk}(t)] \rho_{ijk}[p_{ijk}(t)] dt \quad (12)$$

where
$n_{ijk}(t)$: number of impressions per unit time as a function of time.
$\rho_{ijk}(P_{ijk})$: probability to convert an impression to purchases as a function of item price.
$b_{ijk}$: cost per impression.
$w_{ijk}(b_{ijk})$: winning probability for CPM (i, j, k) at bid price $b_{ijk}$.

The meanings of the other listed variables are as before defined, and various constraints may be adjusted accordingly.

Solutions to Employ Formulation

While the above formulation is quite compute-intensive, the following novel proposed heuristic solutions can improve the compute efficiency dramatically.

Ranking Order Approach:
When the time frame is quite small, the following assumptions can be made:
$b_{ijk}$ is a constant and independent of time t.
$p_{ijk}$ is a constant and independent of time t.
$\rho_{ijk}(p_{ijk})$ is a constant and independent of time t.
$w_{ijk}(b_{ijk})$ is a constant and independent of time t.
$n_{ijk}(t)$ and $r_{ijk}(t)$ are constants and independent of time t.

Under the above assumptions, the formulation is reduced to a pure Integer Programming problem. When the combination of search engine, key word set, and ad position is large, the solution, however, is still somewhat compute-intensive. To reduce the computation complexity further, one can rank each combination contribution to the seller's utility and pick the combinations with the highest contribution, which by definition is minimizing the expenditure as well.

Suppose the cumulated revenue, profit, and sales volume are, respectively, $R_t$, $M_t$ and $S_t$ at time t, and consider a time period (t, t+$\Delta$t). When $\Delta$t is small enough, the above assumptions are valid. Furthermore, it is assumed that all the sellers are bid price takers, which means if they bid at market CPC, they will win the auctions.

The tuple (i, j, k) contribution to the seller's utility may be expressed as $$\Delta u = u(t+\Delta t) - u(t) \quad (13)$$

where $$u(t) = w_R u_R(R_t, R_T) + w_M u_M(M_t, M_T) + w_S u_S(S_t, S_T) \quad (14)$$

$$u(t+\Delta t) = w_R u_R(R_t + \Delta R, R_T) + w_M u_M(M_t + \Delta M, M_T) + w_S u_S(S_t + \Delta S, S_T) \quad (15)$$

and $$\Delta R = N_{ijk} Q_{ijk} r_{ijk} \rho_{ijk} p_{ijk} \quad (16)$$

$$\Delta M = N_{ijk} Q_{ijk} r_{ijk} \rho_{ijk} (p_{ijk} - C) - N_{ijk} r_{ijk} b_{ijk} \quad (17)$$

$$\Delta S = N_{ijk} Q_{ijk} r_{ijk} \rho_{ijk} \quad (18)$$

$N_{ijk}$ is the total number of impressions during period (t, t+Δt). Based on the budget constraints, the seller then selects top contributors to bid on.

Single Search Engine, Key Word, and Ad Position:

If, as in FIG. 2, there is only a single search engine, key word set and ad position the seller can choose from, the formulation is further reduced to a problem of pure calculus of variations:

$$\max_{b(t), p(t)} [u(T)] \quad (19)$$

Possible additional price constraints could take the forms of $$P_L \leq p(t) \leq P_H \quad (20)$$

$$B_L \leq b(t) \leq B_H \quad (21)$$

where $P_L$ and $P_H$ are floor and ceiling prices for the product; and $B_L$ and $B_H$ are floor and ceiling auction prices for the key word set.

Further simplifications can be made, if so desired, to calculate optimal auction prices.

Assuming b(t) and p(t) are independent of time t and are constants, n(t) is also a constant, and the total number of impressions for the period is N, the respective cumulated revenue, profit, and sales volume become $$R(T) = NQrw(b)\rho(p)p \quad (22)$$

$$M(T) = NQrw(b)\rho(p)(p - C) - Nw(b)b \quad (23)$$

$$S(T) = NQrw(b)\rho(p) \quad (24)$$

The optimization formulation then becomes $$\max_{b, p} [u(T)] \quad (25)$$

If the product price p is fixed and known, the optimal auction price b can be easily derived. On the other hand, if the seller has won the key word auction, the seller can optimize the product price based on the seller's targets. This problem may be formulated as:

$$\max_{p} [u(T)] \quad (26)$$

Thus, there are multiple ways automatically to select the advertising channels for the search engine and for display ads, and in a manner which optimizes the targets, while simultaneously minimizing the expenditure. The results for search-engine and for web-display ads can be easily compared to determine the better channels among them, resulting in an optimized answer when working with both.

In an enhanced embodiment, as shown in FIG. 5, the search engine sorts the incoming leads into various buckets using a pre-defined criterion, and runs CPC auction for each such bucket, thus enabling the advertisers to target the customer base better while simultaneously enabling the search engine to maximize its returns. As an example, a credit card provider may want the search engine to sort the incoming search queries in 4 buckets based on the consumer's credit score, and bid only for the desired buckets. Further real-time optimization can occur if the seller decides to pick a certain percentage of the leads from a multiple of such buckets. If the leads were sorted out in 4 separate buckets, for example, and the seller chooses to pick, say, 30% of its total leads from bucket number 1, 20% from bucket 2, 35% from bucket 3, and 15% from bucket 4, then the SAEJ correspondingly will automatically compute an optimum CPC bid price for each such bucket. FIG. 6 shows this application with multiple search engines.

In another embodiment, as shown in FIG. 7, the search engine delivers each lead coupled with its associated characteristics, such as income level, region, gender, age group, to various advertisers, and in real-time. Such advertisers then use the SAEJ actively to compete with each other and iteratively bid in real-time to get the best placement for the lead. This obviously, will introduce some delay in responding to the query while the real-time competitive auction is on-going; however, this delay may be acceptable so long as the auction can be completed in a reasonable time. In this application, the advertiser makes a bid for a search query at hand, unlike the previously described cases where bids are made in advance in anticipation of the query arrival. FIG. 8 shows this application with multiple search engines.

In summary, this novel automatic, adaptive, feedback-driven real-time optimization engine SAEJ of the invention results in the following advantages to the seller (advertiser):

(1) Ability automatically to optimize its time-sensitive business targets such as profit, revenue and inventory in real-time and in response to dynamic market conditions, and without any manual intervention (2) Ability automatically to adjust 24×7, 365 days a year, the seller's relative degree of emphasis among various targets (at times in conflict with one another) as a function of what is left to be filled and how much time is left to meet the targets.

(3) Ability automatically to discover in real-time the price that the market will bear for each of the products and update them on a continuous basis without manual intervention and according to the market dynamics.

(4) Ability automatically to compute the price in real-time for every transaction, resulting in optimization of the seller's unique business targets.

(5) SAEJ provides the ability to use an approach such as 'Utility Derivative-Following' along with its own historic bid response curve, as in copending application Ser. No. 11/880,980, to automatically discover in real-time the price best suited to optimize its targets without having to make inherently speculative predictions.

(6) Ability to compute and keep them updated in real-time for each product: different price for each lead source, using the 'Target Directed Approach'; and historic bid response function for each such lead source of said copending application. This enables the seller to price differently if a lead originated, for example, from a high-end magazine versus a local newspaper, if so desired.

(7) SAEJ has the ability automatically to compute the optimum promotion price which will result in optimization of the targets. This enables a seller minimally to reduce the price necessary to meet the targets. Using the previously cited example, if a retailer could reduce the price in a specific instance by only 20.5% instead of 25%, a significant savings is achieved for someone whose margin of error tend to be around 3 to 4%.

(8) Ability automatically to determine when to start a promotion. If, for example, inventory is high compared to where it ought to be in relationship with the rest of the targets, then the price may be correspondingly set within seller-specified constraints to accelerate the inventory reduction to bring it in line with the rest of the targets,— all accomplished in real-time 24×7, 365 days a year. It also enables determination as to when to stop the promotion depending on the market conditions.

(9) SAEJ has the ability to run planned promotions as per its configuration without manual intervention, while automatically optimizing the unique business targets in real-time.

(10) Ability to create event-driven promotions and automatically run very short term promotions in real-time, such as when nearing a supplier's break, in order to capitalize on the same by making appropriate price adjustments to accelerate towards the threshold and then revert back to the normal mode.

(11) SAEJ has the ability automatically to initiate an advertisement on an as-planned basis.

(12) SAEJ has the ability automatically to initiate event-driven advertisements for each product, subject to seller configured triggers.

(13) Ability automatically to compute the optimum CPC bids for each search engine, for each set of key words, for each ad position for each product, for selected geographical regions, and other specified criterion.

(14) Ability automatically to evaluate and rank the order of the prevailing CPC bids according to the contribution to the unique business targets, with minimum expenditure, and for each search engine, for each set of key words, for each ad position, for each product, for selected geographical regions and other specified criteria.

(15) Ability simultaneously to compute the appropriate product price in addition to the CPC bid in order to optimize the targets.

(16) Seller's CPC bid decisions are completely synergistic with its unique business targets.

(17) CPC bids are automatically computed in real-time as a function of seller's targets, such as revenue, profit, product inventory, supplier's break, current target status as a function of time, desired relative degree of emphasis at that time, and the competitive market pricing for CPC for the desired ad placement.

(18) Each CPC bid is computed in a manner so as to optimize the seller's unique targets while simultaneously minimizing the CPC expenditure.

(19) No manual intervention and associated inherent speculation is required while computing the CPC bids, thereby eliminating today's significant inherent margins of error.

(20) SAEJ enables instantaneous adaptation and responsiveness to evolving competitive market conditions in terms of ad placement location and corresponding CPC pricing for each set of key word for each product and for each search engine, such that contribution to the seller's unique business targets is optimized while minimizing expenditure—all performed without any manual intervention.

(21) Ability automatically to make the pricing decisions instantaneously to adapt to the dynamically altering market place as reflected by the variance in the CTR, to optimize the targets.

(22) Ability automatically to make the pricing decisions instantaneously to adapt to dynamically altering competitive pressures reflected by the variations in the CPC bid prices, and in a manner to optimize the targets.

(23) Ability automatically to avail supplier's break when nearing such threshold, by simultaneously increasing the advertisement expenditure and/or coupled with appropriate product price reduction, both within seller's configured constraints, so as to accelerate towards the threshold. When the threshold is reached, then it subsequently reverts back to the normal mode of operation, thus effectively running a synergistic, very short term automatic promotion and advertisement.

(24) The advertiser also has the ability quickly to create event-driven promotions synergistic with the advertisement and unique business targets.

(25) Expenditure stays within the bounds established and configured by the seller, while the SAEJ optimizes the unique business targets within such constraints, thereby eliminating unplanned open ended expenditure, or less than optimum results for the money spent.

(26) Ability automatically to compute the optimum CPM bids for each desirable web site for display ads, for each set of contextual key words for each product for selected geographical regions and other specified criteria.

(27) Ability automatically to evaluate and rank order of the prevailing CPM bids according to the contribution to the unique business targets and with minimum expenditure, for each desirable web site for display ads, for each set of contextual key words for each product, for selected geographical regions and other specified criteria, as mentioned above.

(28) Ability simultaneously to compute the appropriate product price in addition to the CPM bid to optimize the targets, with the seller's CPM bid decisions completely synergistic with its unique business targets.

(29) CPM bids are automatically computed in real-time as a function of seller's targets such as revenue, profit, product inventory, supplier's break, current target status as a function of time, desired relative degree of emphasis at that time, and the competitive market pricing for CPM for the desired web site.

(30) Each CPM bid is computed in a manner to optimize the seller's unique targets, while simultaneously minimizing the CPM expenditure.

(31) No manual intervention and associated inherent speculation required while computing the CPM bids, thereby eliminating significant inherent margin of error.

(32) SAEJ enables instantaneous adaptation and responsiveness to evolving competitive market conditions in terms of CPM pricing for each set of contextual key word for each product for each desirable web site, such that the contribution to the unique business targets is optimized while minimizing expenditure—and all performed without any manual intervention.

(33) Ability automatically to make the pricing decisions instantaneously to adapt to the dynamically altering market place as reflected by the variance in the CTR, thereby to optimize the targets.

(34) Ability automatically to make the pricing decisions instantaneously to adapt to the dynamically altering competitive pressures as reflected by business targets, while minimizing expenditure and staying within its budgetary constraints.

(35) Ability automatically and in real-time dynamically to arbitrage the advertising expenditure among both the search engine-based advertising channels, and the display ad channels and in a manner which optimizes its unique business targets while minimizing the advertising expenditure, and while staying within the budgetary constraints.

(36) Ability to scale this arbitrage capability to emerging channels such as video and mobile.

(37) In the alternative embodiment, the advertiser gets the ability to make a bid on higher quality of leads using the sorting buckets made at the search engine, and further, has the ability to optimize the percentage of bids picked from each such bucket.

(38) In another alternative embodiment, the advertiser will be able to make iterative competitive bids in response to a specific user query with its unique characteristics instead of making CPC bids in advance in anticipation of a query.

The Invention as Applied to TV Advertising—Real-Time Evaluation of Accurate Demographics, Iterative Bids, and Synergistic Optimization of Targets:

In this architecture, as shown in FIG. 9, the invention enables real-time, competitive, iterative on-line auction to occur among advertisers to win the advertising right for a commercial slot in the next POD for each of the currently playing shows at each of the participating networks. Actual real-time demographics collected from the set-top boxes and associated characteristics such as time of the show, duration, show ratings such as 'PG' or 'R', POD number, slot number within the POD and so, on are provided by the networks to each participating advertiser in the auction. The advertisers compute the bid price while optimizing the aggregated demographics across the networks. The details are as follows:

In this novel idea, an advertiser assigns an aggregating bucket for each of the demographic characteristic provided by the networks, such as age groups, income levels, gender split, geographic distribution, time zone, and education levels, and so on. Each such bucket is then assigned its unique fulfillment target over a pre-specified interval, again based on the advertiser's own unique business objectives. The advertiser receives in real-time, current viewer demographics of each program showing at that moment, typically from the data collected via set top boxes or equivalent technologies. Real-time on-line iterative bids auction is held among advertisers to win the right to advertise in each of the available commercial slots in the next POD for each show across the participating networks.

An adaptive, automated, feedback-driven real-time iterative auction engine SAEJ as described in said co-pending applications, is again here used by the advertisers automatically to compute and iteratively bid for each auction. Real-time demographic data, existing distance to the aggregating targets, the specified time interval for the targets, prevailing market conditions, budgetary constraints as configured by the advertiser, and other such variables are then used by the SAEJ, automatically to compute the bid price for the auctioning of the next slot for the selected show, such that it optimizes the aggregating demographic targets over a pre-defined time frame.

As an illustration, an advertiser such as Toyota Motor Company, may want to target 35-year or younger folks for its new moderately priced sports car. In this case, it will bid for slots in shows that attract a higher percentage of that age group as compared to another advertiser marketing products targeted towards a largely older population. Each participating advertiser's SAEJ makes iterative bids in real-time to win its desired slots. It continuously updates its aggregating buckets as it wins the slots in some of the auctions, evaluates the status of buckets as a function of what is left to be bid, the remaining distance to the targets, the competitive market dynamics reflected in recent bids pricing and its budgetary constraints, and automatically appropriately adjusts its bid-pricing for the next slot auction. The relative degree of emphasis among targets changes with time as buckets are filled, potentially some doing better, and others doing worse than expected. The emphasis shifts in a manner so as to compensate for the aggregating buckets deficient in meeting their time-sensitive targets, and the SAEJ accounts for this relative shift in emphasis and automatically includes it in the bid computation process as it works towards optimizing the targets. All of this is accomplished, moreover, in accordance with the invention without any manual intervention.

Consider an example of a popular TV program such as "American Idol"; its viewership varies widely on week-by-week basis depending on the phase of the program, the guest artists performing and the popularity of the actual participants left, and also on the popularity of the shows on the other networks presented at the same time. Performance could even vary significantly within its performance duration if another popular sporting event or show started, for example, 30 minutes after American Idol starts to air. In this embodiment of the invention, the advertisers compete by iteratively bidding in real-time for each desired commercial slot in a POD armed with the current and accurate demographic information, instead of relying on inherently inaccurate predictions made in advance. Furthermore, this allows the advertiser automatically to readjust its bidding strategy in real-time depending on the contribution made by each such winning slot to the overall demographic targets.

As an illustration, suppose the advertiser sets three targets (N1, N2 and N3) for three demographics attributes (attribute 1, 2, 3). The targets are number of impressions for each specific attribute, and, as an example, the attributes could be age (<35), gender (male) and income level (>$50 k/year). This is herein disclosed with a mathematical model wherein bias weights $w_1$, $w_2$, and $w_3$ are assigned to each target.

At any moment, the cumulated impressions for each target are $n_1$, $n_2$, and $n_3$. The distances to targets are defined as $$d_1 = N_1 - n_1 \tag{27}$$

$$d_2 = N_2 - n_2 \tag{28}$$

$$d_3 = N_3 - n_3 \tag{29}$$

When choosing a commercial slot, the distance-based relative weights are used for each target. They are defined as $$\alpha_1 = \frac{d_1}{d_1 + d_2 + d_3} \tag{30}$$

$$\alpha_2 = \frac{d_2}{d_1 + d_2 + d_3} \tag{31}$$

$$\alpha_3 = \frac{d_3}{d_1 + d_2 + d_3} \tag{32}$$

When a new advertisement slot is chosen, the potential contributions to target impressions are $\Delta n_1$, $\Delta n_2$ and $\Delta n_3$. The weighted, aggregated, and normalized contribution to the target is then calculated as $$C = \frac{w_1 \Delta n_1 + w_2 \Delta n_2 + w_3 \Delta n_3}{p(1+d)} \tag{33}$$

Here, p is the price for the time slot, and d is the "distance" to the desired target ratios. The objective of the present invention, is synergistically to approach the targets cost effectively in a balanced manner.

There are multiple ways to define distance d. One definition is $$d = \sqrt{\left(\alpha_1 - \frac{\Delta n_1}{\Delta n_1 + \Delta n_2 + \Delta n_3}\right)^2 + \left(\alpha_2 - \frac{\Delta n_2}{\Delta n_1 + \Delta n_2 + \Delta n_3}\right)^2 + \left(\alpha_3 - \frac{\Delta n_3}{\Delta n_1 + \Delta n_2 + \Delta n_3}\right)^2} \quad (34)$$

Alternatively, the distance may also be defined as $$d = \sqrt{\left(\frac{n_1 + \Delta n_1}{\sum_i (n_i + \Delta n_i)} - \frac{N_1}{\sum_i N_i}\right)^2 + \left(\frac{n_2 + \Delta n_2}{\sum_i (n_i + \Delta n_i)} - \frac{N_2}{\sum_i N_i}\right)^2 + \left(\frac{n_3 + \Delta n_3}{\sum_i (n_i + \Delta n_i)} - \frac{N_3}{\sum_i N_i}\right)^2} \quad (35)$$

The sum is over all targets (i=1, 2, 3).

Assume, for example, that there are 'M' time slots available, and the price for slot i is $p_i$. The slot should be ranked by contribution factor 'C'. A higher 'C', means higher efficiency, which, in general, is preferable. The symbol $\rho_i(p_i)$ represents the probability, during the auction for the advertiser to win slot i at price $p_i$. The price optimization problem can be formulated as $$\max_{(p_1, \ldots, p_M)} \sum_{i=1}^{M} C_i \rho_i(p_i) \quad (36)$$

such that $$P_i^{min} \le p_i \le P_i^{max}, i = 1, \ldots, M \quad (37)$$

$$\sum_{i=1}^{M} p_i \rho_i(p_i) \le B$$

The first constraint here involved is the price limitations on each time slot; and the second condition, is the overall budget constraint. As there are multiple slots bid at the same time, 'B' is the total budget for all the time slots across the different channels. Other constraints can be added as required or desired.

Technology for enabling the reaching of each individual household and delivering targeted shows and ads is currently at an early stage of development. In an alternative embodiment, the networks could sort the viewership data not only into separate buckets, such as by income level, gender, age group and so on, but it may also, as proposed by the present invention, make each of these separate buckets available for auction. As an example, a network may sort its current viewership by gender and offer both buckets up for auction. A manufacturer of female hygiene products is highly likely to bid for the female viewers only in the case of targeted ads to individual households/viewers. This will result in optimized targeting. Another example may that of a sports car manufacturer wanting to advertise to only those below 35 and willing to pay more for such targeted advertising. This could be further enhanced, as the ability to individually delivered ads also brings the capability to click on such ads by its viewer, if so desired. In such a case, this will resemble a web-based display ad. The techniques described earlier can also be used by the advertisers to optimize their business targets such as profit, revenue, inventory and so on. This will also enable a more effective measurement of the impact an advertisement has had on the viewers.

In another alternative embodiment, an auction may be held for more than one slot in a POD, or across the PODS, at a time, or could be held not for the very next POD, but rather for a succeeding one. Auctions could also be held at the beginning of the show (when the first actual demographics become available) for a pre-defined number of slots at pre-defined placements spread over partial or the entire duration of the currently on-going show, or variations thereof. Clearly, as the bundling of the slots for the same show increases, the accuracy resolution of the demographics becomes progressively diminished. Some advertisers, however, may be willing to trade some accuracy for continuity, as in the case of a time-sensitive promotion.

In yet another embodiment, a network may choose to make a group of slots available for auction, say on a 4 to 6 week basis, after the show has aired at least once. This may be desirable for those advertisers who need a minimum number of specific slots during a specific time frame—such as a car manufacturer launching a new vehicle in October. This process allows advertisers to have some visibility in the demographics data for the show prior to making advance commitments offset by corresponding increased margins of error and the risks outlined earlier, as the other commercial slots in the same show will be auctioning off while the show is playing on TV. The advertiser has the ability, furthermore, to compensate in case of negative variance in demographics by winning more slots at that time.

In yet another alternative embodiment, some networks may not want to hold the auctions for all the slots in the manner described above, and may split in a manner such that a fix percentage (e.g. 25%) are sold in advance of any airing of the shows, and the rest are dealt with in the manner described above or by variations thereof. This will allow the networks to have minimum guaranteed advertising fees regardless of the future performance of the shows. It will also allow them to cover the first few minutes of the show when demographics data collection and sorting is still underway. If networks choose to operate in this manner, the SAEJ technique of the invention may well be used by advertisers to compute bids in a manner as to optimize the aggregated anticipated demographics as competitive bids are made for these slots in advance—in this example, for 25% of the slots. As the remaining 75% of the commercial slots in the same shows will be auctioning off when the shows are playing on TV, moreover, the advertiser has the ability to compensate for negative variance in various demographic characteristics by winning more appropriate slots across the shows at that time, and as part of its optimization process of the actual demographic targets.

The use of the invention, as thus applied, results in the following advantages:

(1) The advertiser does not need to make demographic predictions about each slot in each POD in each show across the participating networks for any time in the entire season; thus eliminating huge margins of error, since the actual demographics is used instead of the inherently inaccurate anticipated demographics.

(2) The networks do not need to make speculative judgments about demographics performance for each show and for each POD within such show, and thus do not need to bear responsibility for the significant inherent risk associated with it.

(3) SAEJ of the invention automatically makes the optimized complex decisions in real-time within constraints as configured by the advertiser. There is no need for the advertiser to negotiate manually so many slots across very many networks and to try to manually optimize, even at an extremely crude level, while in the middle of negotiations.

(4) Advertiser's SAEJ automatically selects the commercial slot with the demographic characteristics best suited to optimize that advertiser's unique demographics targets derived from its own unique business objectives, while simultaneously automatically minimizing the expenditure, all in real-time.

(5) The influence of competing shows at the same time, or in preceding or following time segments, or any other extraneous factor across networks are fully accounted for in this automated real-time approach, with no need to speculate about impact on a specific slot of a specific POD of a specific show from other shows.

(6) SAEJ also accounts for the changes occurring in real-time, while the show is on and correspondingly decides to bid or not to bid and the amount to bid, depending on (a) then prevailing demographics immediately prior to the next POD, (b) the fill status of the aggregating buckets as compared to the advertiser's desired targets, and (c) the competitive bids, and so on.

(7) SAEJ evaluates each slot according to the data provided by the networks (and by definition) accounts for the time zone, or the region the program is on, and the on-going shows on other networks.

(8) The ability of the SAEJ to optimize targets in real-time while minimizing expenditure is not impacted by the program scheduling or changes in the scheduling as time goes by or upon the occurrence of some last minute changes due to a major unplanned event.

(9) This architecture consistently produces accurate optimized aggregated demographics for the advertiser, 24×7 basis, even when dealing with over 80 million+time slots per year in the United States alone.

(10) Advertiser has the ability accurately to measure its performance against the demographic targets and the money spent, any time, all the time 24×7. The need to do manual cumbersome performance analysis is eliminated.

(11) Advertiser's ad expenditure is always automatically minimized even as the relative degree of emphasis among its unique targets evolves with time.

(12) Advertiser has the ability automatically to adjust in real-time the ad spending as a function of time based on the unique demographics for each slot for each show across all the shows.

(13) Advertiser has the ability to change the targets themselves at any moment at any stage, if its advertising or promotion strategy has changed. It will automatically and instantaneously result in correspondingly different bidding strategy optimizing of the new targets.

(14) Aggregated demographic targets are optimized in real-time within the constraints of the overall budget.

(15) This method of the invention enables automatic optimum price discovery in real-time for each slot in each POD in each show for each participating network, benefiting both the advertisers and the networks and making the process fair to both parties involved.

(16) Automatic iterative competitive bidding among numerous advertisers for each slot enables the networks to receive the maximum ad revenue from each slot in each POD in each show.

(17) No middlemen, such as advertising agencies, are needed, resulting in significant savings for the advertiser and the networks and with a highly efficient process, that is relatively inexpensive, entirely automatic, and wherein each auction takes only a few minutes or less and runs in parallel for all the shows currently under viewing, obviating today's months of manual negotiations.

(18) SAEJ makes simultaneous bidding for large numbers of slots in a manner that minimizes expenditure per slot while receiving the optimum demographics to simultaneously optimize the targets. This is accomplished while staying within the budgetary constraints as configured by the advertiser, resulting in a substantial reduction in manpower and associated expenditure for both networks and advertisers.

(19) Unlike Google's before-described scenario, the advertiser has the ability to plan an advertising campaign with some committed slots over the same show for a pre-defined interval using one of the alternative embodiments of the invention.

(20) Also, unlike the Google process, the advertiser has complete control on its budget and the automatic demographic optimization with simultaneous expenditure minimization in real-time, within budgetary constraints. In an alternative embodiment, each sub-demographics could be auctioned off individually, enabling advertisers to target their ads even better. With an ability to click on an ad, each viewer now can be viewed as if a web display ad had been placed, enabling a more effective measurement of the impact an advertisement has had on the viewers. In another alternative embodiment, a combination of advanced selling of some slots and real-time selling of remaining slots can be offered by networks, enabling an advertiser to guarantee continuity of slots and shows for a pre-specified interval to run its campaign such as a new product introduction.

(21) In the case where slots are sold in advance, SAEJ may also be used to participate in iterative bids for such slots while simultaneously optimizing the anticipated demographics for each slot for each show across the networks.

In this solution, of the invention, the real-time on-demand iterative auction is held until the last advertiser is standing. It is not artificially terminated at a predefined time in spite of having a very limited time between the commercials. The invention rather uses a novel technique of a catalyst, termed called 'Bump-up Function' or in short (BUF), resulting in an inherently fair, accelerated and timely resolution as will now be detailed.

As described earlier, SAEJ iteratively bids with its own unique bidding strategies without any manual intervention. The Auctioneer Controller ('AC') uses a 'BUF' under various circumstances, but with a basic objective to accelerate the auction process especially when the number of participants is very large, or the minimum step up for the next bid is not sufficient for a plurality of the participants to back down in reasonable time, or where but few participants have locked horns, with, each bettering the bid only by a minimum amount, or there is a tie. Regardless of the situation presented, the winner resolution is accomplished without ever compromising the auction's inherent fairness. In accordance with the present invention, BUF can be deployed immediately after the first round of bids onwards, regardless of when the number of bidders, or, in the early phase only when number of bidders is high, or, intermittently during the auction, or, towards the tail end of the auction, or combinations and variations thereof. The deployment decision is configurable by the AC. The key difference is that, instead of the highest bidder from the most recently completed round becoming the bidder to beat in the subsequent round, the hurdle gets raised even higher, thus forcing the advertisers to show their hand quicker, resulting in a faster drop-out rate among participants. BUF is used to compute a value (Bump-up Value) which is added to the highest bid received by the 'AC' from the last round and sent back to the bidders to beat. The bidders in the subsequent round either decide to beat this increased value or drop out. The computation of Bump-up Value depends on number of variables, including, but not limited to, the number of advertisers who participated in the just-completed round, the directional change in number of bidders from one round to the next (number of bidders went up or down); the change in the number of advertisers in a pre-defined number of consecutive rounds, or how many rounds have happened, and so on.

An example of a BUF of the invention may be mathematically represented as:

$$f(t,n,r)=K[1+\text{rand}(0,1)]f_t(t)f_n(n)f_r(r) \quad (38)$$

where
K: Scaling factor;
rand(0,1): Random number between 0 and 1;
$f_t(t)$: Bump up factor as a function of remaining time t;
$f_n(n)$: Bump up factor as a function of number of remaining bidders;
$f_r(r)$: Bump up factor as a function of number of rounds.
As the remaining time decreases, the bump-up size increases ($\alpha>0$); or as the remaining time decreases, the bump-up size also decreases ($\alpha<0$).

$$f_t(t)=A+e^{-\alpha t} \quad (39)$$

$$f_n(n)=B-e^{-\beta n} \quad (40)$$

As the number of bidders is large, the bump-up size is also big.

$$f_r(r)=C+e^{-\gamma r} \quad (41)$$

As the number of rounds increase, the bump-up size decreases ($\gamma>0$); or as the number of rounds increases, the bump up size also increases ($\gamma<0$).

In addition to Bump-up Value, each SAEJ also receives the highest bid value and number of bidders from the last round from the 'AC'. The SAEJs respond by either improving their respective bids incrementally higher than the 'Bump-up Value' or drop out. This process continues until there is only one responder left. At that point, that advertiser is declared the winner. In case no bidder responds to the last 'Bump-up Value', from 'AC', BUF computes a new reduced Bump-up Value, though still higher than the highest bid in the last round. This process continues in accordance with the invention until only a single responder is left. The reduction in value is a function of number of variables, such as the number of advertisers in the previous round, the number of rounds gone by, the magnitude of the Bump-Up Value as a function of highest bid in the previous round, and so on. In case there is still a tie in which multiple bidders are stuck at the same price, neither willing to move, the AC asks each to make a final best last bid and the winner is picked. If this process does not bring the resolution, then a random number generator can be used to break the tie.

The final price paid by the winning advertiser can be either the highest bid made by the winner if no BUF were involved, or the highest bid value from the previous round prior to the last BUF-generated value resulting in the winning resolution, and/or many variations thereof.

Thus this inherently fair mechanism ensures that the seller receives the best value under any and all circumstances, while simultaneously enabling the highest bidder to buy the desired advertising opportunity.

In an alternative embodiment, no information is provided to advertisers about how many bidders participated in the last round. This forces buyers to participate instead of staying in a holding pattern, since they do not know which one may turn out to be the last round.

Thus, in all of the above embodiments, of the invention, a true 'Auction' takes place with the outcome not dependent on the luck of the draw. The advantages for the above auctioning strategy of the invention thus include that the advertiser with the best bid will always win the auction; the 'Seller System' gets the best possible price under any and all circumstances—a true auction, indeed; there is inherent fairness to all the participants; and this improvement can also apply to any type of 'Time-Constrained' auction, even in different applications, such as eBay or optimum price discovery prior to IPO.

Further enhancements can be made by integrating the different media types such as web-based advertising and TV advertising in a common SAEJ to provide additional optimization across all the media types while simultaneously minimizing the expenditure as shown in FIG. 10. This will result in a 'Global Advertising Auction Market Place' working as 'Auctioneer Controller', providing a common platform in which each advertiser can distribute its advertising budget to various media outlets in a manner which optimizes its business objectives including minimum expenditure, while simultaneously providing access to networks, search engines and display ads.

Further modifications will also occur to those skilled in this art and such are considered to fall within the spirit and scope of the invention as defined in the appended claims.

The invention claimed is:
1. A method of optimizing one or more of search engine-based advertising, on-line display advertising, and/or television (TV) advertising, the method comprising:
  providing for a seller/advertiser, an automated, adaptive computer engine (seller automated engine, or SAEJ) capable of optimizing one or more seller targets in real-time;
  evaluating in real-time, within the SAEJ, the seller's advertising options in the context of one or more of current cost-per-click (CPC), of current cost per thousand impressions (CPM), of the status of said targets, and/or of the current market conditions;
  computing in real-time one or more bids, taking into consideration one or more of the expense associated with each bid, the current status of said targets, and/or the requisite product and/or service pricing needed to optimize said targets; and
  automatically allocating advertising selections.
2. The method of claim 1 further comprising identifying and rank-ordering optimal CPC and/or CPM bids according to a contribution made by each towards meeting one or more seller targets.
3. The method of claim 1 wherein the SAEJ computes an optimum price and/or promotion for an offered product and/or service to further optimize said one or more targets.

4. The method of claim 1 wherein for short term advertisements and/or short term promotions, the SAEJ automatically adjusts at least one of: one or more ad placements and corresponding CPC bids and/or corresponding CPM bids; one or more CPC bids; the number of ads and corresponding CPM bids; product price; and/or service price.

5. The method of claim 4 further comprising, following a short term advertisement and/or short term promotion, the SAEJ reverting back to a normal mode of operation for at least one of: one or more ad placements; one or more CPC bids; one or more CPM bids; product pricing; and/or service pricing.

6. The method of claim 1 wherein the SAEJ optimizes one or more seller targets by computing one or more of CPC and/or CPM advertising channel selection, advertisement placement, bid pricing, product pricing, and/or service pricing.

7. The method of claim 1 wherein said optimizing is effected using one or more of the following equations to maximize seller utility at the end of a time period T:

$$\max_{x_{ijk}, b_{ijk}(t), p_{ijk}(t)} [u(T)]$$

where utility of seller at time t is u(t):

$$u(t) = w_R u_R(R(t), R_T) + w_m u_m(M(t), M_T) + w_s u_s(S(t), S_t);$$

expected total cumulated revenue up to time t based on cost per click is R(t):

$$R(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)] p_{ijk}(t) d t;$$

expected total cumulated revenue up to time t based on cost per thousand impressions is R(t):

$$R(t) = \sum_{i,j,k} x_{ijk} \int_0^t Q_{ijk} n_{ijk}(t) w_{ijk}[b_{ijk}(t)] \rho_{ijk}[p_{ijk}(t)] p_{ijk}(t) d t;$$

expected total cumulated profit up to time t based on cost per click is M(t):

$$M(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)][p_{ijk}(t) - C] d t - \sum_{i,j,k} x_{ijk} \int_0^t n_{ijk}(t) r_{ijk}(t) w_{ijk}[b_{ijk}(t)] b_{ijk}(t) d t;$$

expected total cumulated profit up to time t based on cost per thousand impressions is M(t):

$$M(t) = \sum_{i,j,k} x_{ijk} \int_0^t Q_{ijk} n_{ijk}(t) w_{ijk}[b_{ijk}(t)] \rho_{ijk}[p_{ijk}(t)][p_{ijk}(t) - C] d t -$$

$$\sum_{i,j,k} x_{ijk} \int_0^t n_{ijk}(t) w_{ijk}[b_{ijk}(t)] b_{ijk}(t) d t;$$

expected total cumulated sales volume up to time t based on cost per click is S(t):

$$S(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)] d t;$$

expected total cumulated sales volume up to time t based on cost per thousand impressions is S(t):

$$S(t) = \sum_{i,j,k} x_{ijk} \int_0^t Q_{ijk} n_{ijk}(t) w_{ijk}[b_{ijk}(t)] \rho_{ijk}[p_{ijk}(t)] d t;$$

a first constraint is set as $x_{ijk} = 0, 1$;
a single ad-position bid constraint is $$\sum_k x_{ijk} \leq 1;$$

an ad budget constraint is $$\sum_{i,j} x_{ijk} \int_0^T n_{ijk}(t) r_{ijk}(t) w_{ijk}[b_{ijk}(t)] b_{ijk}(t) d t \leq B_k;$$

a total budget constraint is $$\sum_{i,j,k} x_{ijk} \int_0^T n_{ijk}(t) r_{ijk}(t) w_{ijk}[b_{ijk}(t)] b_{ijk}(t) d t \leq B;$$

i denotes search engine; j denote key word set; k denotes ad position;
$x_{ijk}$ is 1 when engine i, keyword j, and position k is chosen or 0 otherwise;
$b_{ijk}$ is a bid price or cost per impression function of time t for tuple (i,j,k);
$w_{ijk}(b_{ijk})$ is the winning probability for tuple (i,j,k) at bid price $b_{ijk}$;
$p_{ijk}$ is the item price function of time t if the click through is from tuple (i,j,k);
$\rho_{ijk}(p_{ijk})$ is the probability to purchase items or convert an impression into a purchase at unit price $p_{ijk}$;
$Q_{ijk}$ is the number of items purchased when a click is from (i,j,k);
$n_{ijk}$ is a total traffic rate function or number of impressions function of time t for tuple (i,j,k);
$r_{ijk}$ is a function of time t for the probability to click on an impression, determining the click through rate for tuple (i,j,k);
C is a fixed cost per item;
$u_R$ is a revenue utility function;
$w_R$ is a revenue utility weight;
$R_T$ is a revenue target;
$u_m$ is a profit utility function;

$w_M$ is a profit utility weight;
$M_T$ is a profit target;
$u_S$ is a sales volume utility function;
$u_s$ is a sale volume utility weight;
$S_t$ is a sale volume target;
when $b_{ijk}$, $p_{ijk}\rho_{ijk}(p_{ikj})$, $w_{ijk}(b_{ijk})$, $n_{ijk}$, and $r_{ijk}$, are constant and independent of time t, the tuple (i,j,k,) contribution to seller's utility at cumulated revenue $R_t$, profit $M_t$, and sales volume $S_t$ and time period (t, t+Δt) is Δu=u(t+Δt)−u(t) where $u(t)=w_R u_R(R_t,R_t)+w_M u_M(M_t,M_T)+w_S u_S(S_t,S_T),$ $u(t+\Delta t)=w_R u_R(R_t+\Delta R,R_T)+w_M u_M(M_t+\Delta M, M_T)=w_S u_S (S_t+\Delta S,S_T),$ $\Delta R=N_{ijk}Q_{ijk}r_{ijk}\rho_{ijk}p_{ijk},$ $\Delta M=N_{ijk}Q_{ijk}r_{ijk}\rho_{ijk}(p_{ijk}-C)-N_{ijk}r_{ijk}b_{ijk},$ $\Delta S=N_{ijk}Q_{ijk}r_{ijk}\rho_{ijk},$ $N_{ijk}$ is the total number of impressions during period (t, t+Δt); and
when seller choice is limited to a single search engine, keyword set, and ad position, the optimization reduces to $$\max_{b_{(t)},p_{(t)}} [u(T)]$$

which is constrainable by price constraints $P_L \leq p(t) \leq P_H$ and $B_L \leq b(t) \leq B_H$ where $P_L$ and $P_H$ are floor and ceiling prices for a product and $B_L$ and $B_H$ are floor and ceiling auction prices for a key word set; and
when b(t), p(t), and n(t) are constants independent of t, N is the total number of impressions for a period and the cumulated revenue, profit, and sales volume equations reduce to:

$R(T)=NQrw(b)\rho(p)p,$ $M(T)=NQrw(b)\rho(p)(p-C)-Nw(b)b,$ $S(T)=NQrw(b)\rho(p)$ with optimization $$\max_{b,p} [u(T)],$$

and if the seller has already won the key word auction the optimization reduces to $$\max_{p} [u(T)].$$

8. The method of claim 1 wherein the SAEJ automatically computes one or more optimum CPC and/or CPM bids for one or more search engines and/or for one or more web sites and/or for one or more selected sets of one or more key words and/or for one or more selected ad positions and/or for one or more selected products and/or for one or more selected services and/or for one or more selected geographical regions and/or for one or more other specified criteria.

9. The method of claim 1 wherein the SAEJ automatically evaluates and rank orders prevailing CPC bids according to a contribution to one or more seller targets for one or more search engines and/or for one or more selected sets of one or more key words and/or for one or more selected ad positions and/or for one or more selected products and/or for one or more selected services and/or for one or more selected geographical regions.

10. The method of claim 1 wherein the SAEJ automatically computes one or more optimum CPC and/or CPM bids as a function of at least one of: one or more seller targets; one or more statuses of one or more seller targets; one or more statuses of one or more seller targets as a function of time; desired relative degree of emphasis among one or more seller targets; and/or competitive market pricing for CPC and/or CPM for desired ad placement.

11. The method of claim 1 wherein the SAEJ automatically and instantaneously adapts one or more pricing decisions in response to a dynamically altering market place as reflected by variations in a click-through rate (CTR) and/or to dynamically altering competitive pressures reflected by variations in one or more CPC and/or CPM bid prices, in order to optimize one or more seller targets.

12. The method of claim 1 wherein the SAEJ automatically evaluates and rank orders the prevailing CPM bids according to a contribution to one or more seller targets for one or more desirable web sites for display ads and/or for one or more selected sets of one or more contextual key words and/or for one or more selected ad positions and/or for one or more selected products and/or for one or more selected services and/or for one or more selected geographical regions.

13. The method of claim 1 wherein there is provided in real-time dynamic arbitraging of the advertising expenditure among one or more search engine-based advertising channels and/or one or more display ad channels and/or one or more television advertising channels, and in a manner which optimizes one or more seller targets.

14. The method of claim 1 wherein the SAEJ notifies one or more search engines of desired pre-determined characteristics of leads for advertisement opportunities and/or of a desired proportion of leads for advertisement opportunities matching desired pre-determined characteristics.

15. The method of claim 1 wherein the SAEJ makes one or more competitive bids in real-time upon receipt, from a search engine, of a lead and its one or more associated characteristics.

16. A system for optimizing one or more of search engine-based advertising, on-line display advertising, and/or television (TV) advertising, the system having, in combination:
an automated, adaptive, computer engine (SAEJ) provided for a seller/advertiser and capable of optimizing one or more seller targets in real-time;
wherein the SAEJ is capable of evaluating in real-time the seller's advertising options in the context of one or more of current cost-per-click (CPC), of current cost per thousand impressions (CPM), of the status of said targets, and/or of the current market conditions;
wherein the SAEJ is capable of computing in real-time one or more bids, taking into consideration one or more of the expenses associated with each bid, the current status of said targets, and/or the requisite product and/or service pricing needed to optimize said targets; and
wherein the SAEJ is capable of automatically allocating one or more advertising selections.

17. The system of claim 16 wherein the SAEJ is capable of identifying and rank-ordering optimal CPC and/or CPM bids according to a contribution made by each towards meeting one or more seller targets.

18. The system of claim 16 wherein the SAEJ is capable of computing an optimum price and/or promotion for an offered product and/or service to further optimize said one or more targets.

19. The system of claim 16 wherein the SAEJ is configured, for short term advertisements and/or short term promotions, to automatically adjust at least one of: one or more ad placements and corresponding CPC and/or corresponding CPM bids; one or more CPC bids; the number of ads and corresponding CPM bids; product price; and/or service price.

20. The system of claim 19 wherein, following a short term advertisement and/or short term promotion, the SAEJ is capable of reverting back to a normal mode of operation for at least one of: one or more ad placemen; one or more CPC bids; one or more CPM bids; product pricing; and/or service pricing.

21. The system of claim 16 wherein the SAEJ is configured to optimize one or more seller targets by computing one or more of CPC and/or CPM advertising channel selection, advertisement placement, bid pricing, product pricing, and/or service pricing.

22. The system of claim 16 wherein said optimizing is effected using one or more of the following equations to maximize seller utility at the end of a time period T:

$$\max_{x_{ijk}, b_{ijk}(t), p_{ijk}(t)} [u(T)]$$

where
utility of seller at time t is u(t):

$$u(t) = w_R u_R(R(t), R_T) + w_M u_M(M(t), M_T) + w_S u_S(S(t), S_t);$$

expected total cumulated revenue up to time t based on cost per click is R(t):

$$R(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)] p_{ijk}(t) dt;$$

expected total cumulated revenue up to time t based on cost per thousand impressions is R(t):

$$R(t) = \sum_{i,j,k} x_{ijk} \int_0^t Q_{ijk} n_{ijk}(t) w_{ijk}[b_{ijk}(t)] \rho_{ijk}[p_{ijk}(t)] p_{ijk}(t) dt;$$

expected total cumulated profit up to time t based on cost per click is M(t):

$$M(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)][p_{ijk}(t) - C] dt - \sum_{i,j,k} x_{ijk} \int_0^t n_{ijk}(t) r_{ijk}(t) w_{ijk}[b_{ijk}(t)] b_{ijk}(t) dt$$

expected total cumulated profit up to time t based on cost per thousand impressions is M(t):

$$M(t) = \sum_{i,j,k} x_{ijk} \int_0^t Q_{ijk} n_{ijk}(t) w_{ijk}[b_{ijk}(t)] \rho_{ijk}[p_{ijk}(t)][p_{ijk}(t) - C] dt - \sum_{i,j,k} x_{ijk} \int_0^t n_{ijk}(t) w_{ijk}[b_{ijk}(t)] b_{ijk}(t) dt$$

expected total cumulated sales volume up to time t based on cost per click is S(t):

$$S(t) = \sum_{i,j,k} x_{ijk} \int_0^t Q_{ijk} n_{ijk}(t) r_{ijk}(t) w_{ijk}[b_{ijk}(t)] \rho_{ijk}[p_{ijk}(t)] dt;$$

expected total cumulated sales volume up to time t based on cost per thousand impressions is S(t):

$$S(t) = \sum_{i,j,k} x_{ijk} \int_0^t Q_{ijk} n_{ijk}(t) w_{ijk}[b_{ijk}(t)] \rho_{ijk}[p_{ijk}(t)] dt;$$

a first constraint is set as $x_{ijk} = 0, 1$;
a single ad-position bid constraint is $$\sum_k x_{ijk} \leq 1;$$

an ad budget constraint is $$\sum_{i,j} x_{ijk} \int_0^T n_{ijk}(t) r_{ijk}(t) w_{ijk}[b_{ijk}(t)] b_{ijk}(t) dt \leq B_k;$$

a total budget constraint is $$\sum_{i,j,k} x_{ijk} \int_0^T n_{ijk}(t) r_{ijk}(t) w_{ijk}[b_{ijk}(t)] b_{ijk}(t) dt \leq B;$$

i denotes search engine; j denote key word set; k denotes ad position;
$x_{ijk}$ is 1 when engine i, keyword j, and position k is chosen or 0 otherwise;
$b_{ijk}$ is a bid price or cost per impression function of time t for tuple (i,j,k);
$w_{ijk}(b_{ijk})$ is the winning probability for tuple (i,j,k) at bid price $b_{ijk}$;
$p_{ijk}$ is the item price function of time t if the click through is from tuple (i,j,k);
$\rho_{ijk}(p_{ijk})$ is the probability to purchase items or convert an impression into a purchase at unit price $p_{ijk}$;
$Q_{ijk}$ is the number of items purchased when a click is from (i,j,k);
$n_{ijk}$, is a total traffic rate function or number of impressions function of time t for tuple (i,j,k);
$r_{ijk}$, is a function of time t for the probability to click on an impression, determining the click through rate for tuple (i,j,k);
C is a fixed cost per item;
$u_R$ is a revenue utility function;

$W_R$ is a revenue utility weight;
$R_T$ is a revenue target;
$u_m$ is a profit utility function;
$w_M$ is a profit utility weight;
$M_T$ is a profit target;
$u_S$ is a sales volume utility function;
$u_S$ is a sale volume utility weight;
$S_T$ is a sale volume target;
when $b_{ijk}$, $p_{ijk}$, $\rho_{ijk}(p_{ijk})$, $w_{ijk}(b_{ijk})$, $n_{ijk}$, and $r_{ijk}$ are constant and independent of time t, the tuple (i,j,k) contribution to seller's utility at cumulated revenue $R_t$, profit $M_t$, and sales volume $S_t$ and time period (t, t+Δt) is $\Delta u = u(t+\Delta t) - u(t)$ where $$u(t) = w_R u_R(R_t, R_T) + w_M u_M(M_t, M_T) + w_S u_S(S_t, S_T),$$

$$u(t+\Delta t) = w_R u_R(R_t + \Delta R, R_T) + w_M u_M(M_t + \Delta M, M_T) + w_S u_S(S_t + \Delta S, S_T),$$

$$\Delta R = N_{ijk} Q_{ijk} r_{ijk} \rho_{ijk} p_{ijk},$$

$$\Delta M = N_{ijk} Q_{ijk} r_{ijk} \rho_{ijk} p_{ijk} (p_{ijk} - C) - N_{ijk} r_{ijk} b_{ijk},$$

$$\Delta S = N_{ijk} Q_{ijk} r_{ijk} \rho_{ijk},$$

$N_{ijk}$ is the total number of impressions during period (t, t+Δt); and
when seller choice is limited to a single search engine, keyword set, and ad position, the optimization reduces to $$\max_{b(t), p(t)} [u(T)]$$

which is constrainable by price constraints $$P_L \leq p(t) \leq P_H \text{ and}$$

$$B_L \leq b(t) \leq B_H \text{ where}$$

$P_L$ and $P_H$ are floor and ceiling prices for a product and $B_L$ and $B_H$ are floor and ceiling auction prices for a key word set; and
when b(t), p(t), and n(t) are constants independent of t, N is the total number of impressions for a period and the cumulated revenue, profit, and sales volume equations reduce to:

$$R(T) = NQrw(b)\rho(p)p,$$

$$M(T) = NQrw(b)\rho(p)(p-C) - Nw(b)b,$$

$$S(T) = NQrw(b)\rho(p) \text{ with optimization}$$

$$\max_{b,p} [u(T)],$$

and if the seller has already won the key word auction the optimization reduces to $$\max_p [u(T)].$$

23. The system of claim 16 wherein the SAEJ is capable of automatically computing one or more optimum CPC and/or CPM bids for one or more search engines and/or for one or more web sites and/or for one or more selected sets of one or more key words and/or for one or more selected ad positions and/or for one or more selected products and/or for one or more selected services and/or for one or more selected geographical regions and/or for one or more other specified criteria.

24. The system of claim 16 wherein the SAEJ is capable of automatically evaluating and rank ordering prevailing CPC bids according to a contribution to one or more seller targets for one or more search engines and/or for one or more selected sets of one or more key words and/or for one or more selected ad positions and/or for one or more selected products and/or for one or more selected services and/or for one or more selected geographical regions.

25. The system of claim 16 wherein the SAEJ is capable of automatically computing the one or more optimum CPC and/or CPM bids as a function of at least one of: one or more seller targets; one or more statuses of one or more seller targets; one or more statuses of one or more seller targets as a function of time; desired relative degree of emphasis among one or more seller targets; and/or competitive market pricing for CPC and/or CPM for desired ad placement.

26. The system of claim 16 wherein the SAEJ is capable of automatically and instantaneously adapting one or more pricing decisions in response to a dynamically altering market place as reflected by variations in a click-through rate (CTR) and/or to dynamically altering competitive pressures reflected by variations in one or more CPC and/or CPM bid prices, in order to optimize one or more seller targets.

27. The system of claim 16 wherein the SAEJ is capable of automatically evaluating and rank ordering prevailing CPM bids according to a contribution to one or more seller targets for one or more desirable web sites for display ads and/or for one or more selected sets of one or more contextual key words and/or for one or more selected ad positions and/or for one or more selected products and/or for one or more selected services and/or for one or more selected geographical regions.

28. The system of claim 16 wherein the SAEJ is configured for real-time dynamic arbitraging of advertising expenditure among one or more search engine-based advertising channels and/or one or more display ad channels and/or one or more television advertising channels, and in a manner which optimizes one or more seller targets.

29. The system of claim 16 wherein the SAEJ is configured to notify one or more search engines of desired pre-determined characteristics of leads for advertisement opportunities and/or of a desired proportion of leads for advertisement opportunities matching desired pre-determined characteristics.

30. The system of claim 16 wherein the SAEJ is configured to make one or more competitive bids in real-time upon receipt, from a search engine, of a lead and its one or more associated characteristics.

* * * * *